(12) United States Patent
Ha

(10) Patent No.: US 7,975,371 B2
(45) Date of Patent: Jul. 12, 2011

(54) APPARATUS FOR MANUFACTURING A MULTILAYER CHIP CAPACITOR

(75) Inventor: Jae-Ho Ha, Daegu (KR)

(73) Assignee: Sehyang Industrial Co., Ltd., Daegu (KR)

( * ) Notice: Subject to any disclaimer, the term of this patent is extended or adjusted under 35 U.S.C. 154(b) by 479 days.

(21) Appl. No.: 11/914,498

(22) PCT Filed: Jun. 21, 2006

(86) PCT No.: PCT/KR2006/002388
§ 371 (c)(1),
(2), (4) Date: Jul. 21, 2008

(87) PCT Pub. No.: WO2006/137689
PCT Pub. Date: Dec. 28, 2006

(65) Prior Publication Data
US 2009/0279227 A1 Nov. 12, 2009

(30) Foreign Application Priority Data

Jun. 21, 2005 (KR) .................. 10-2005-0053559
Jun. 19, 2006 (KR) .................. 10-2006-0055074

(51) Int. Cl.
*H05K 3/30* (2006.01)
(52) U.S. Cl. ............... 29/740; 29/729; 29/739; 29/840; 228/180.1

(58) Field of Classification Search ............ 29/729, 29/739, 25.03, 25.35–25.42, 740–743; 361/321.2, 361/311; 228/180.1, 180.21–180.22
See application file for complete search history.

(56) References Cited

U.S. PATENT DOCUMENTS 5,048,163 A * 9/1991 Asmus et al. .............. 29/25.01
5,144,747 A * 9/1992 Eichelberger ............... 29/834
6,092,269 A * 7/2000 Yializis et al. ............. 29/25.42

FOREIGN PATENT DOCUMENTS

JP          6-13258 A       1/1994
JP          2002-93658 A    3/2002

* cited by examiner

*Primary Examiner* — Minh Trinh
(74) *Attorney, Agent, or Firm* — Birch, Stewart, Kolasch & Birch, LLP

(57) ABSTRACT

The present invention carries out the vacuum deposition by setting a deposition angle between a single mask set including a shadow mask having a plurality of slits and a deposition source to form a lower terminal layer, a dielectric layer, an inner electrode layer, and an upper terminal layer at once under a vacuum state generated once, or adjusts slit patterns by relatively moving upper and lower mask sets that respectively include shadow masks having a plurality of slits and face each other to form a lower terminal layer, a dielectric layer, an inner electrode layer, and an upper terminal layer at once under a vacuum state generated once.

9 Claims, 20 Drawing Sheets

[Fig. 1]
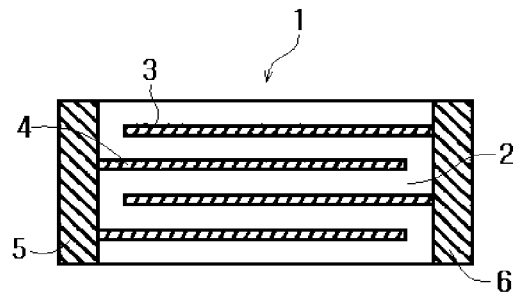
[Fig. 2]
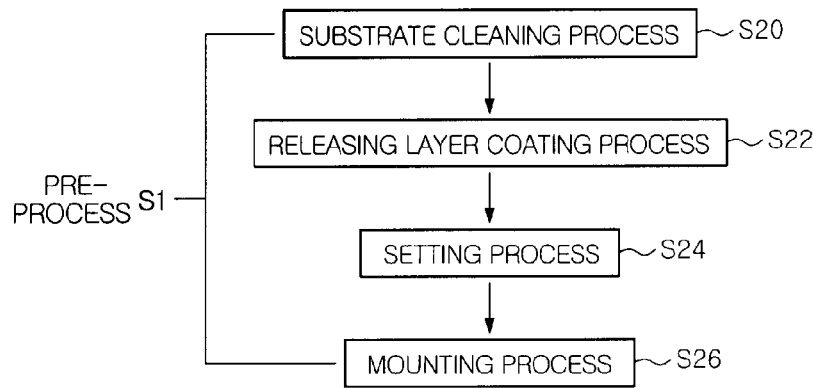
[Fig. 3]
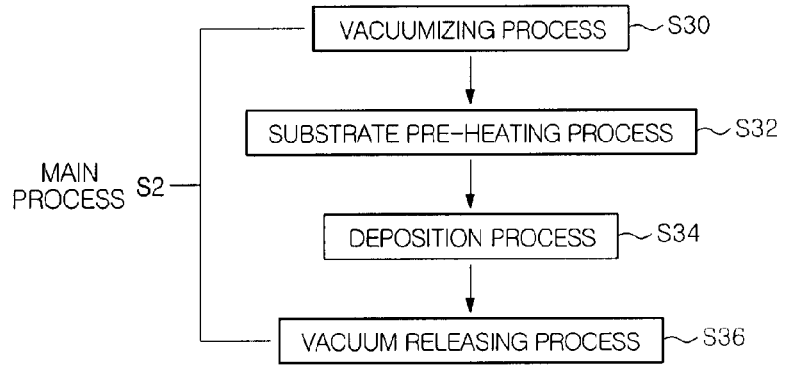
[Fig. 4]
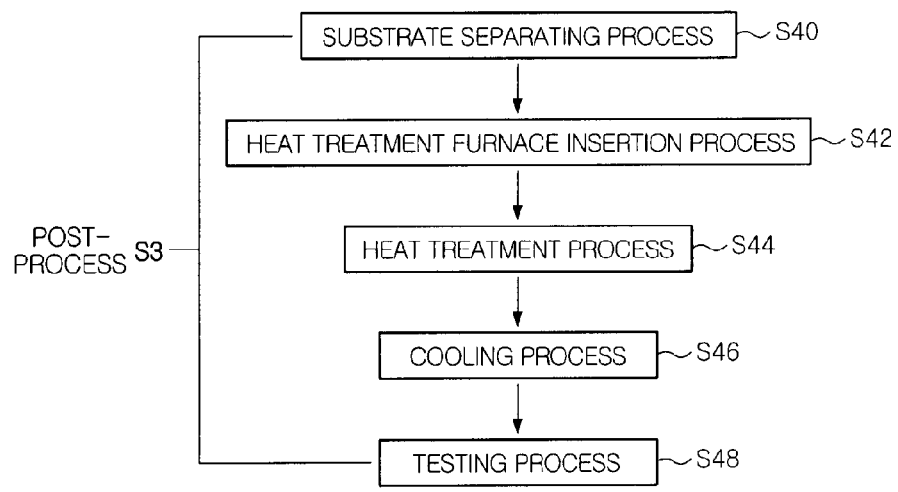

[Fig. 5]
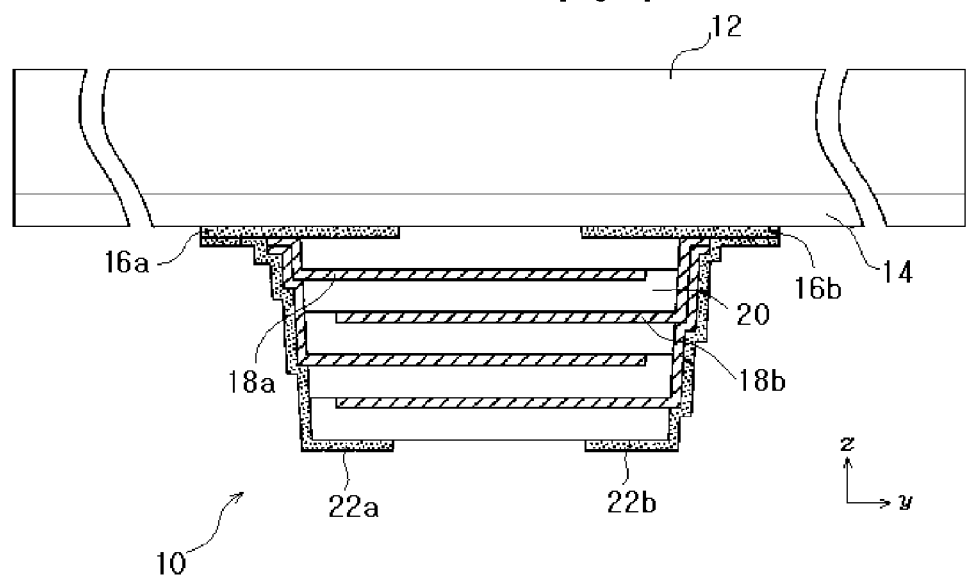
[Fig. 6]
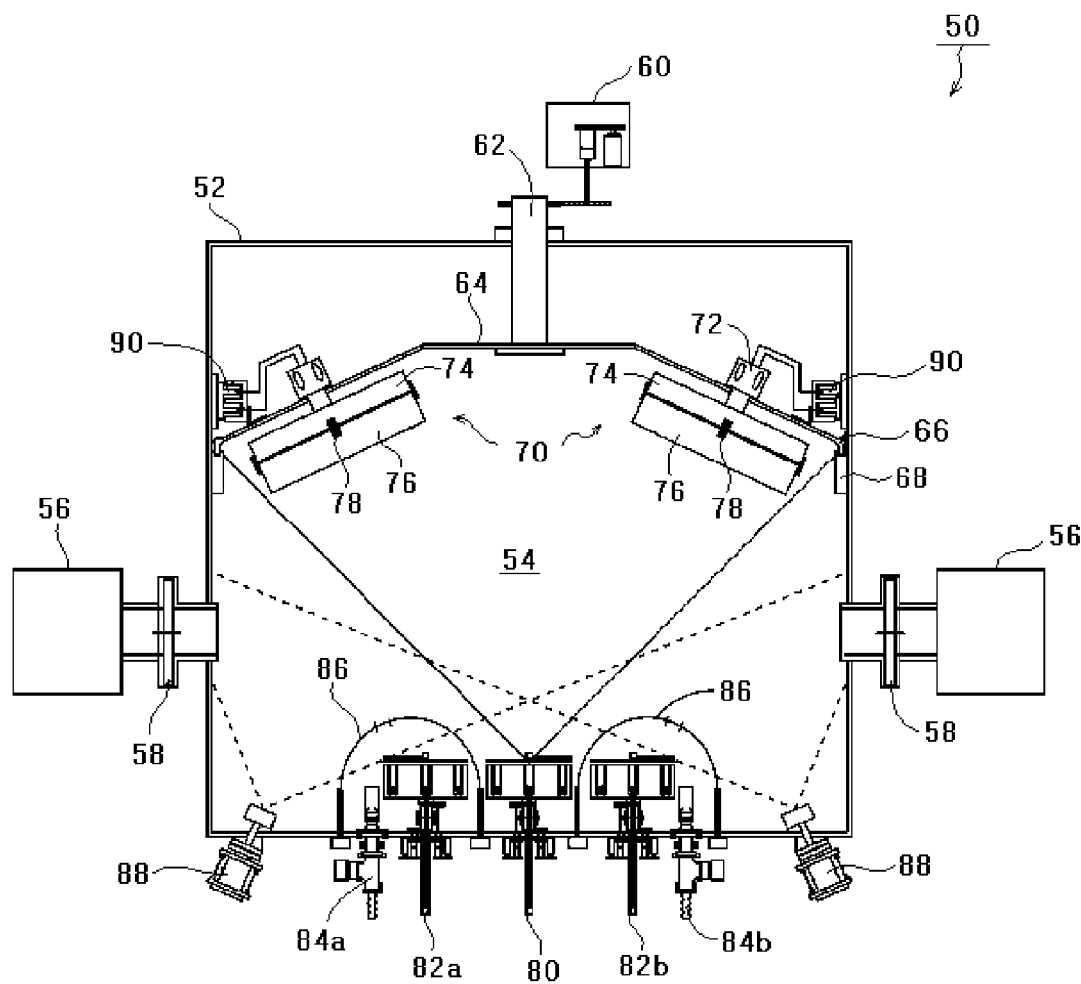

[Fig. 7]
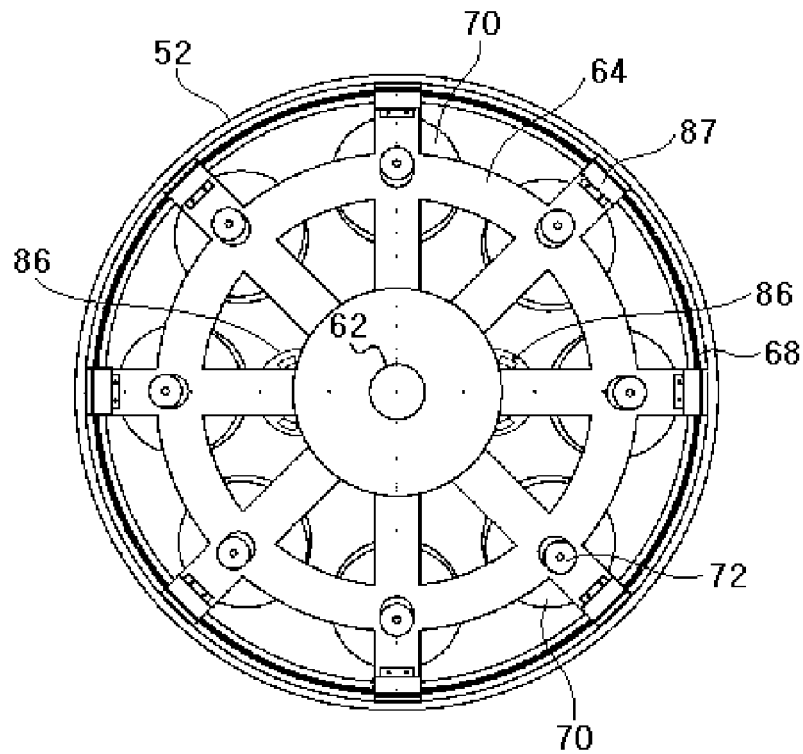
[Fig. 8]
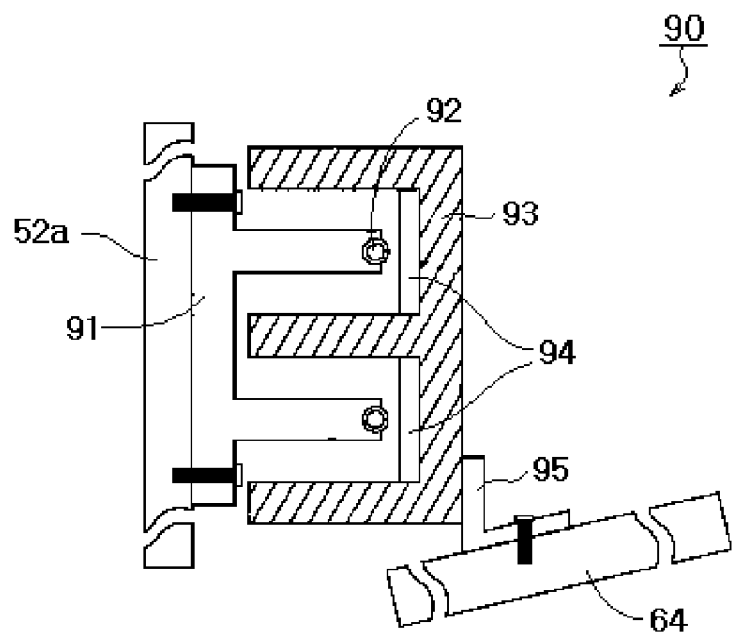

[Fig. 9]
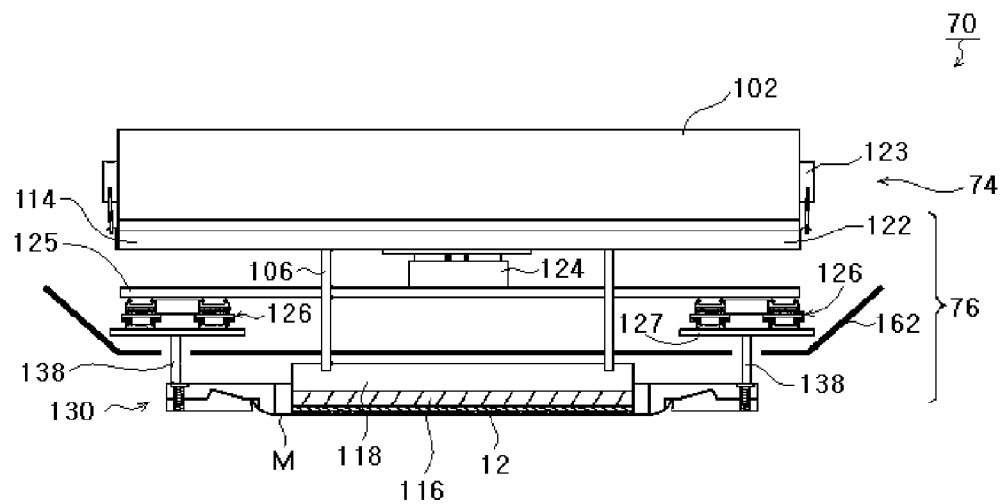
[Fig. 10]
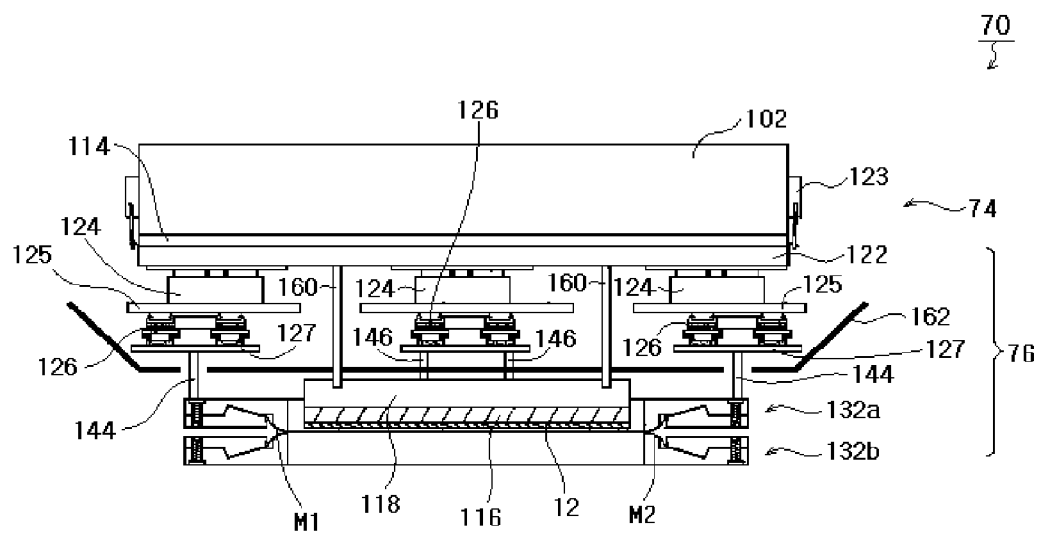

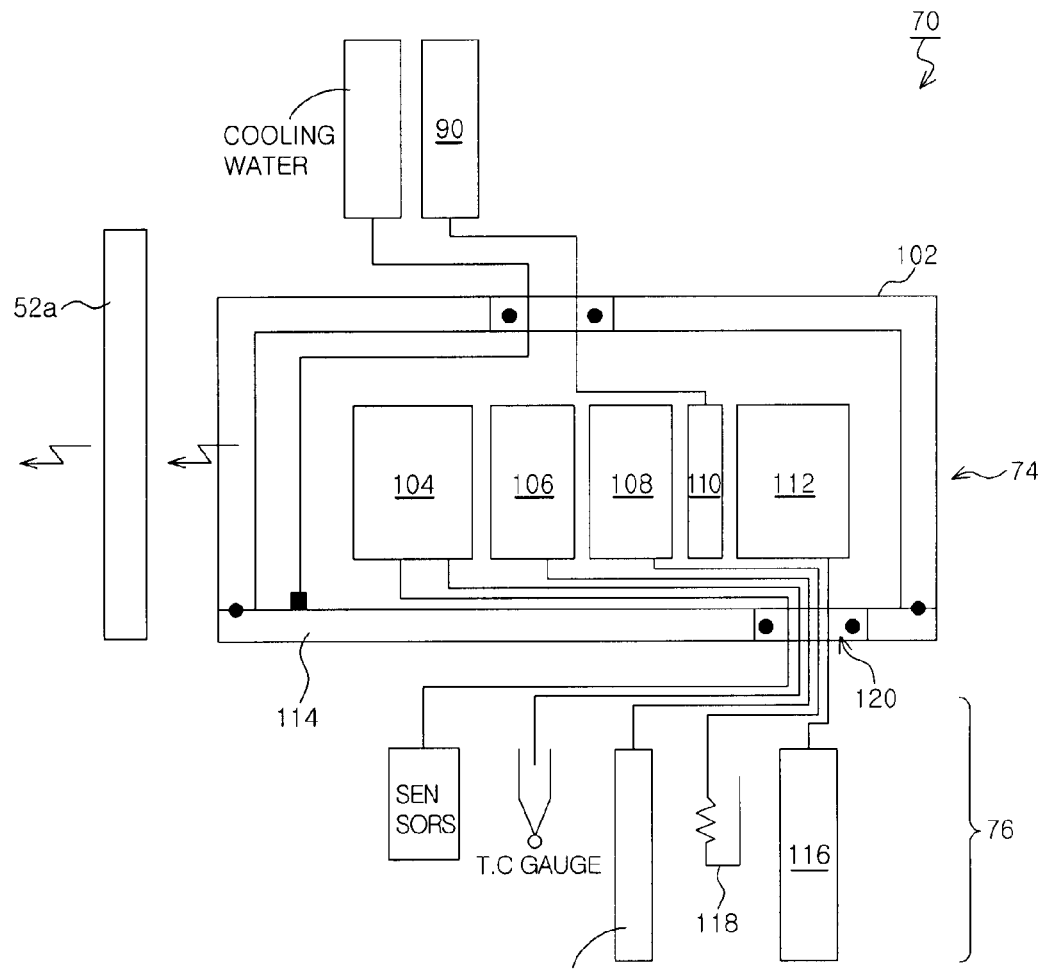
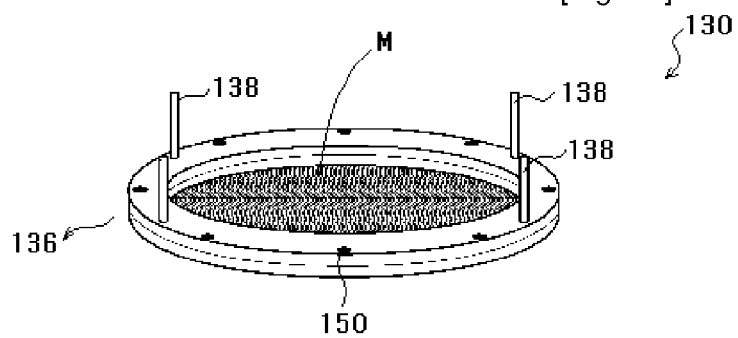

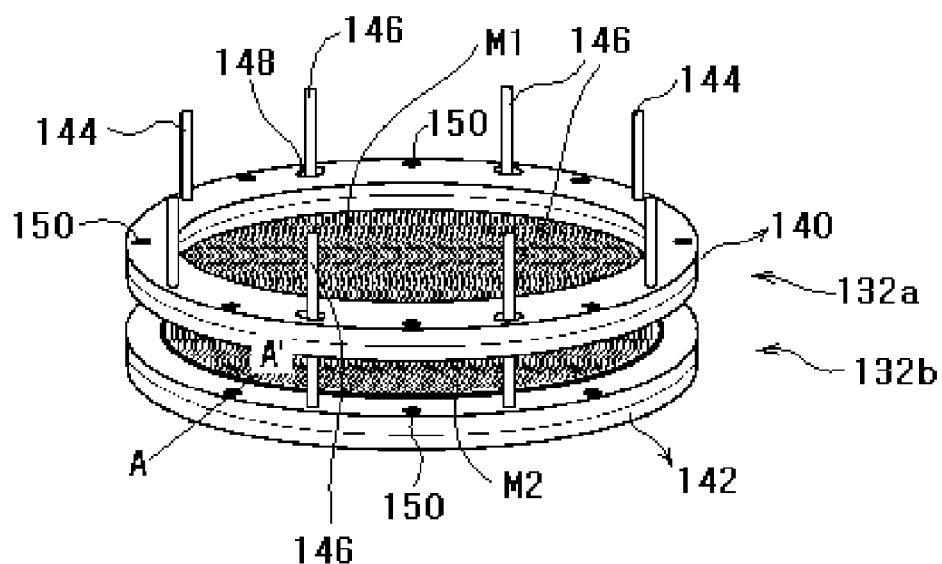
[Fig. 13]
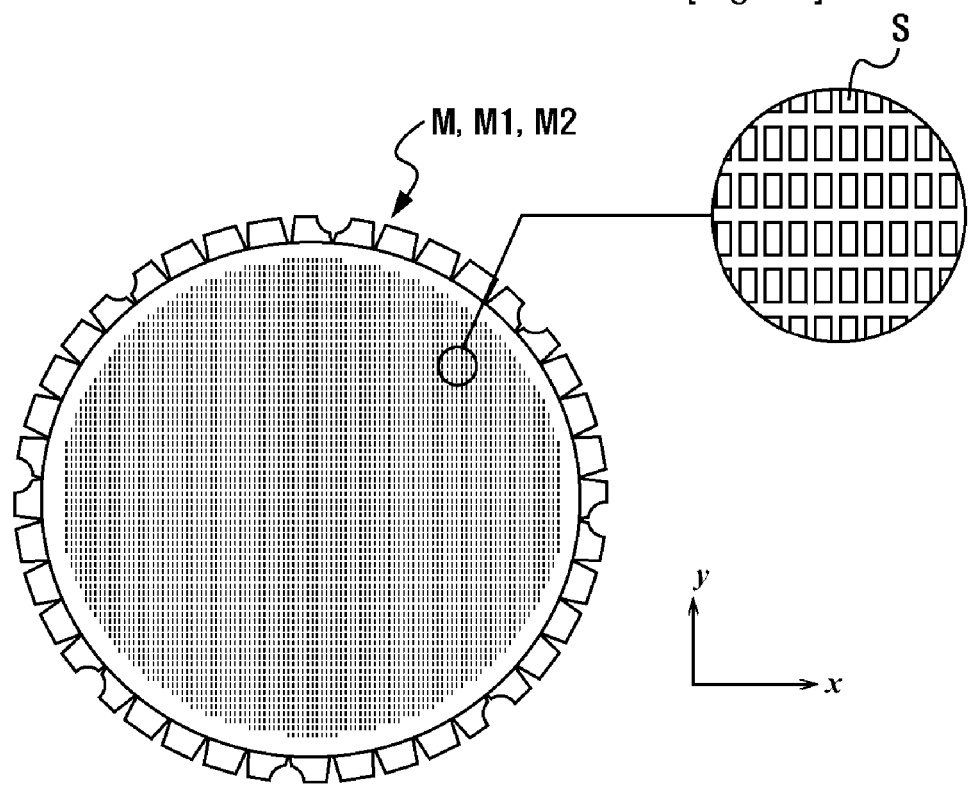
[Fig. 14]

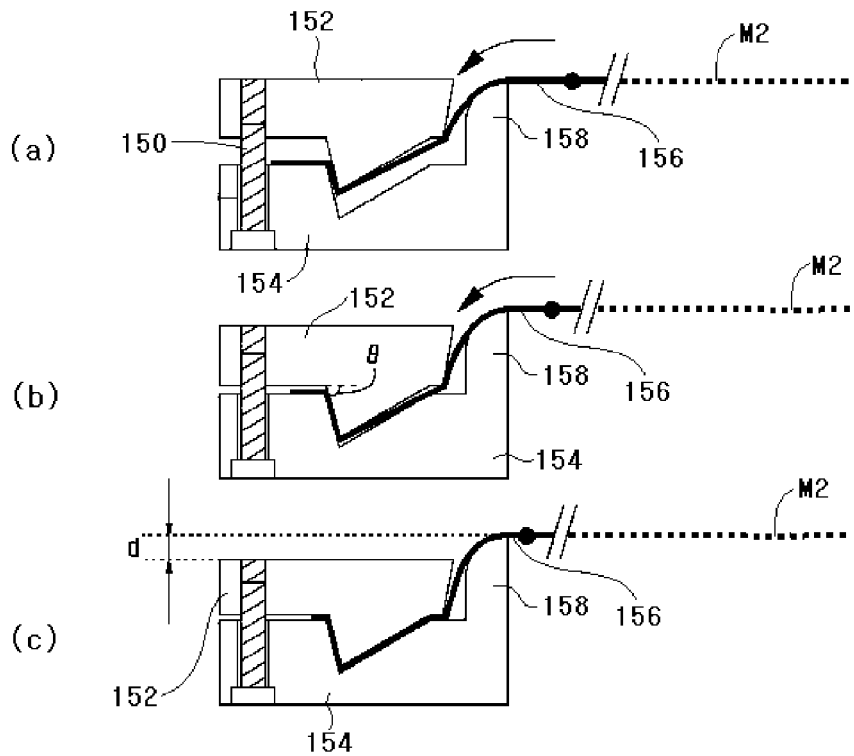
[Fig. 15]
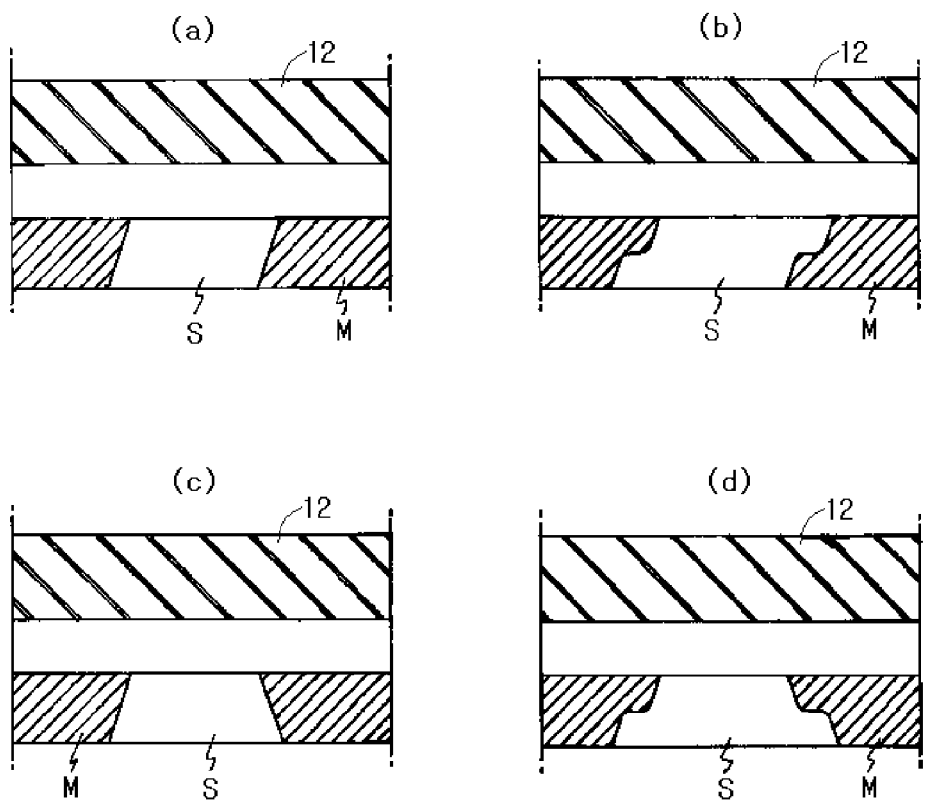
[Fig. 16]

[Fig. 17]
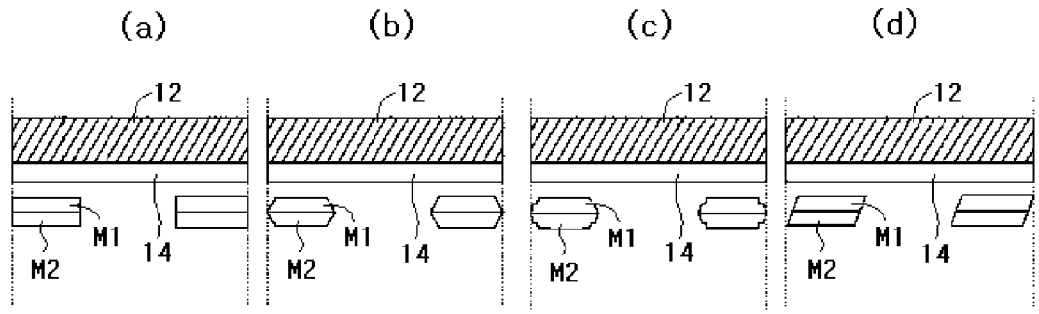
[Fig. 18]
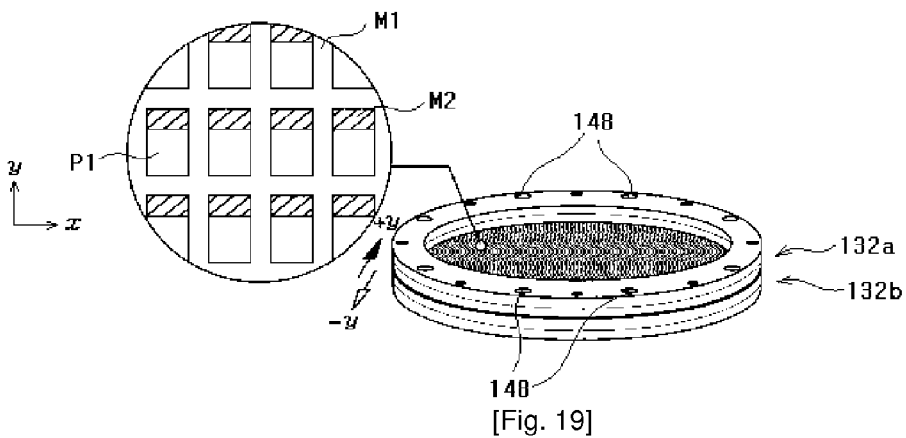
[Fig. 19]
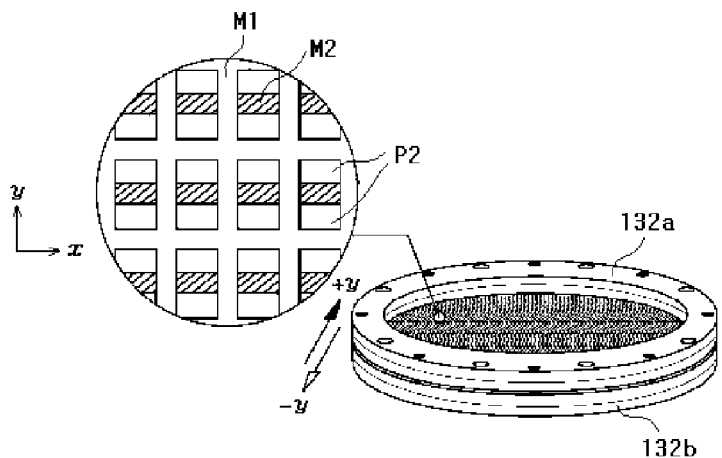
[Fig. 20]
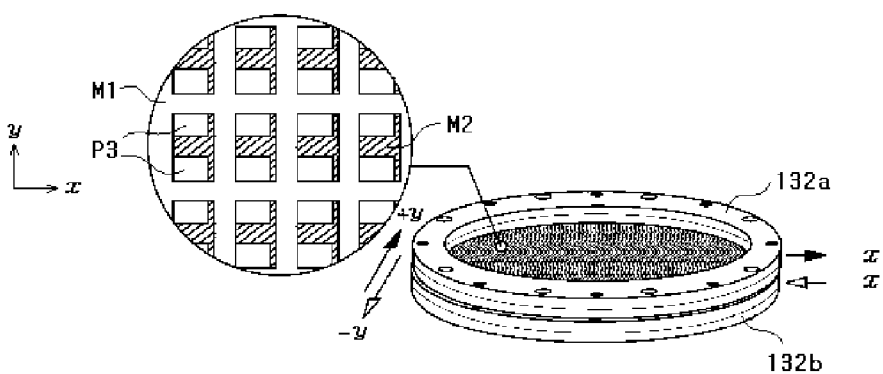

[Fig. 21]
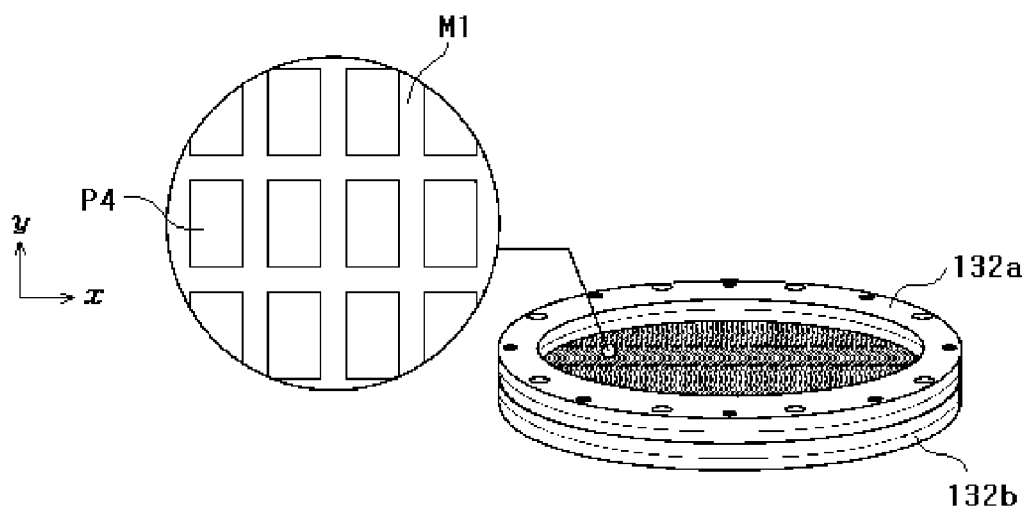
[Fig. 22]
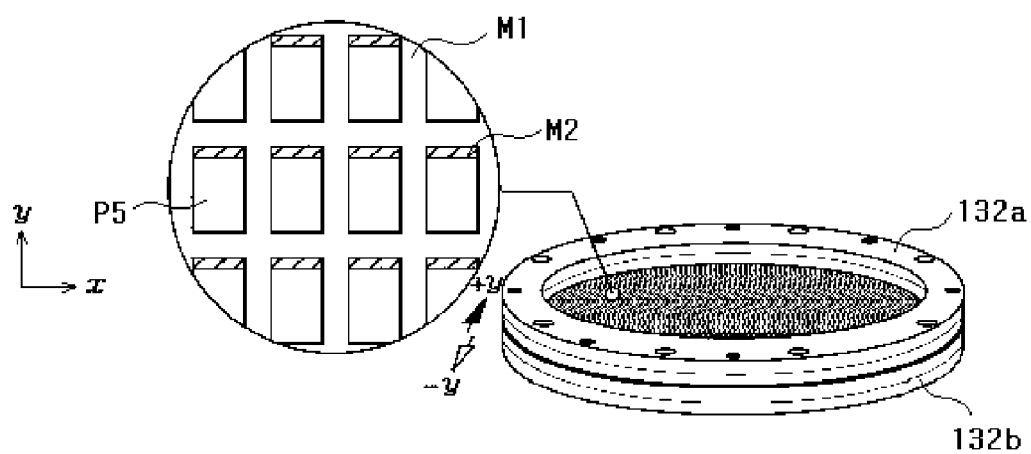
[Fig. 23]
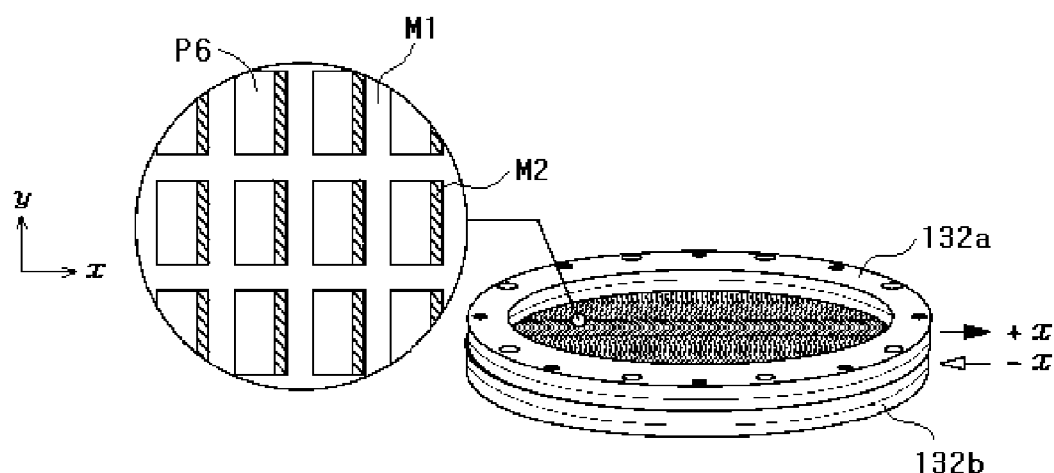

[Fig. 24]
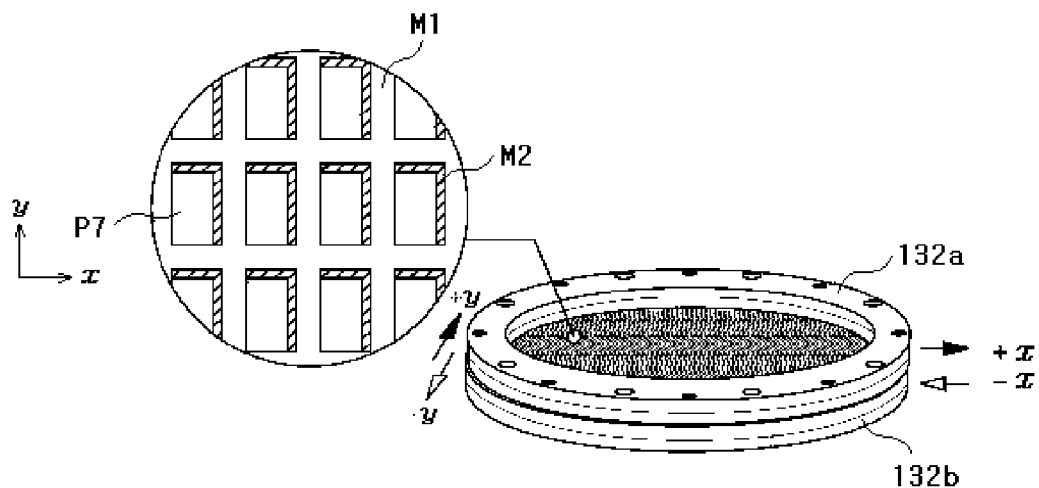
[Fig. 25]
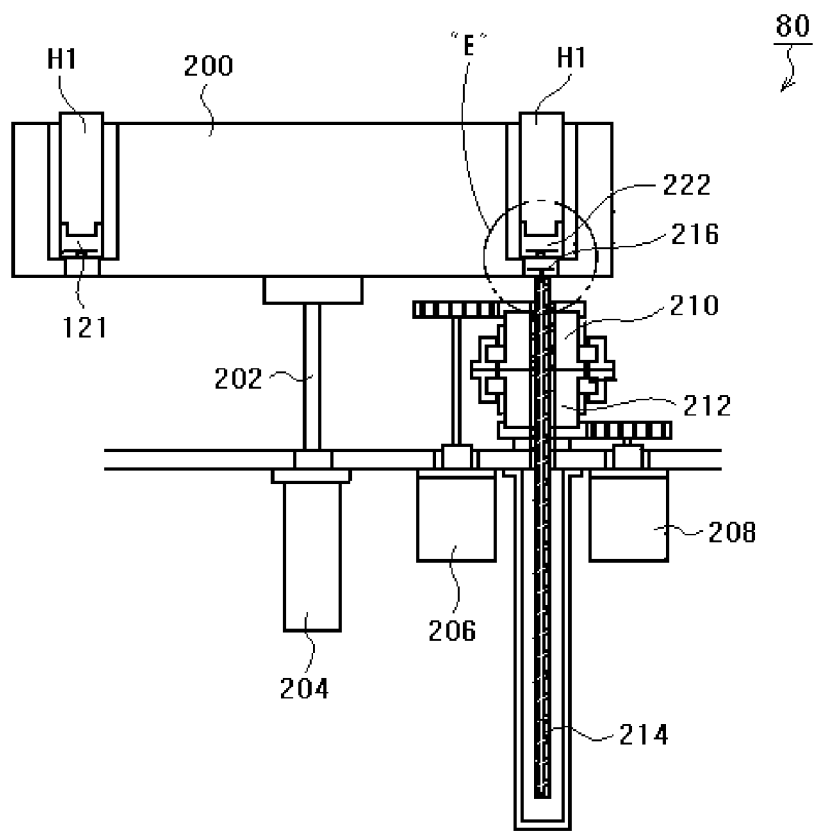

[Fig. 26]
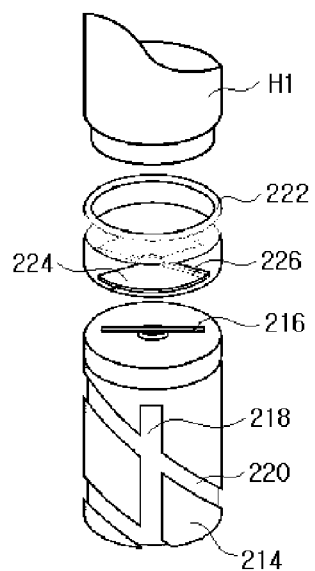
[Fig. 27]
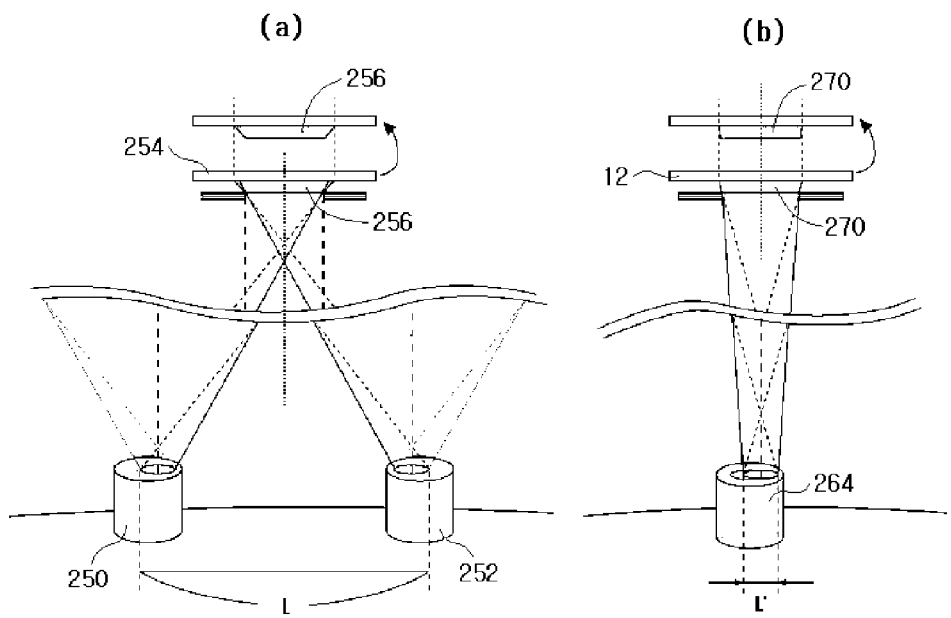
[Fig. 28]
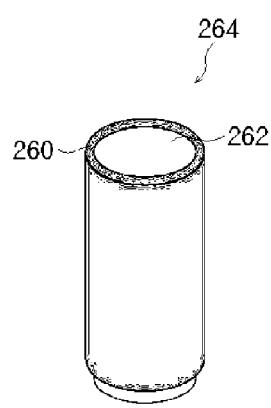

[Fig. 29]
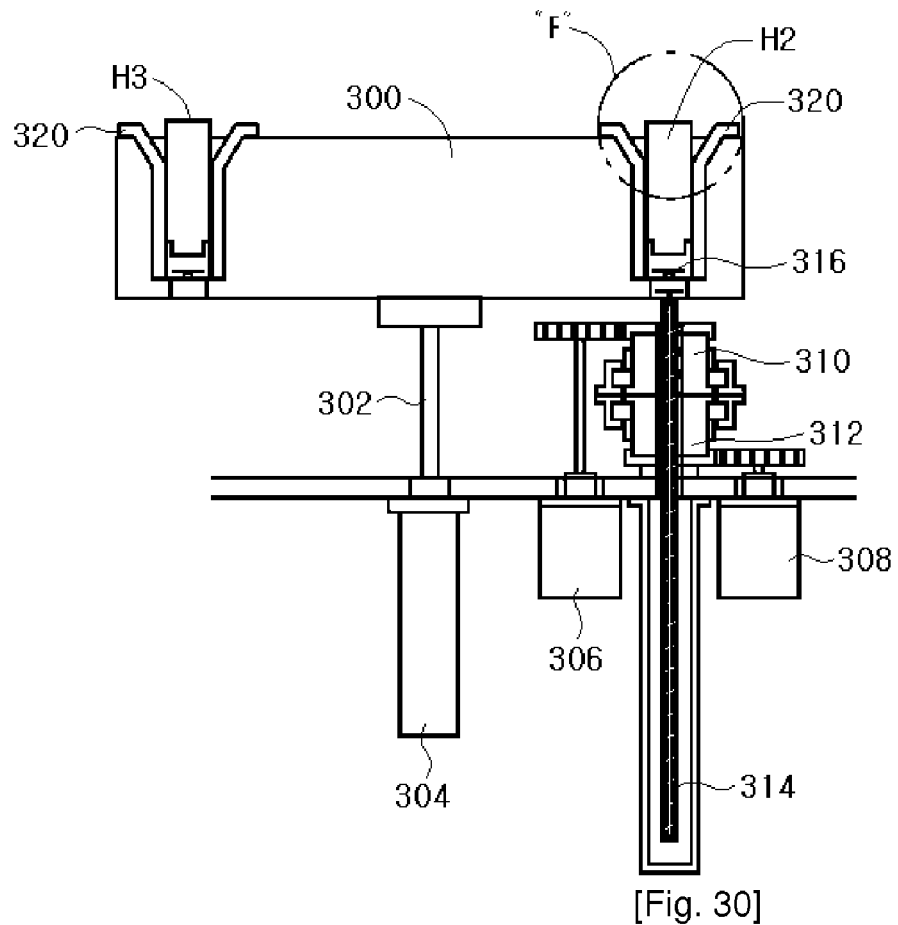
[Fig. 30]
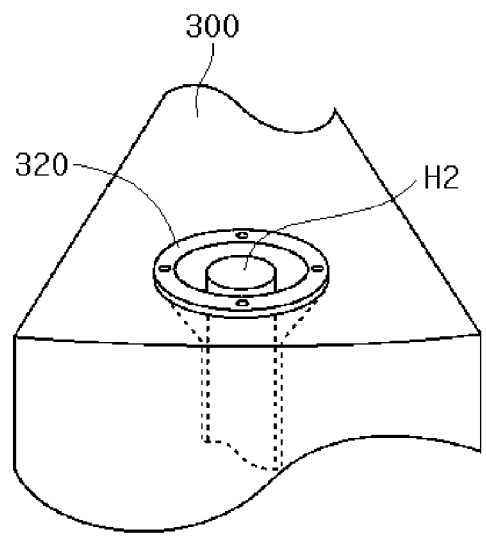

[Fig. 31]
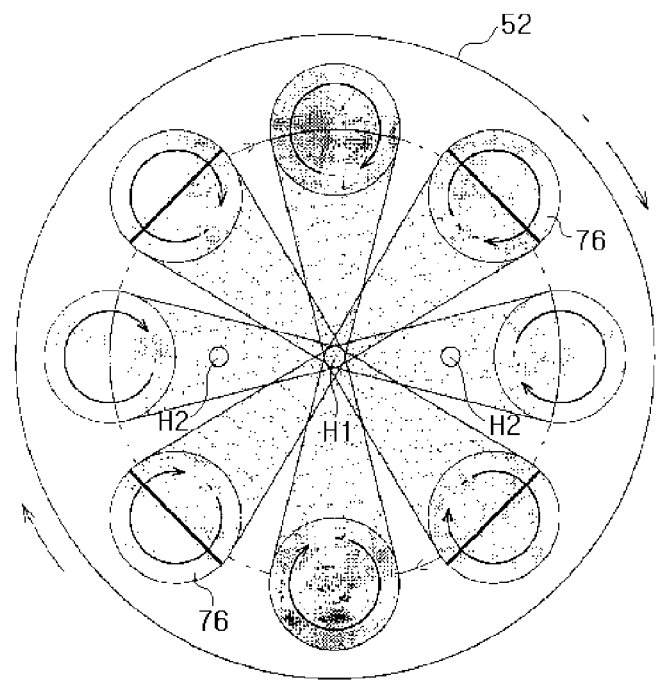
[Fig. 32]
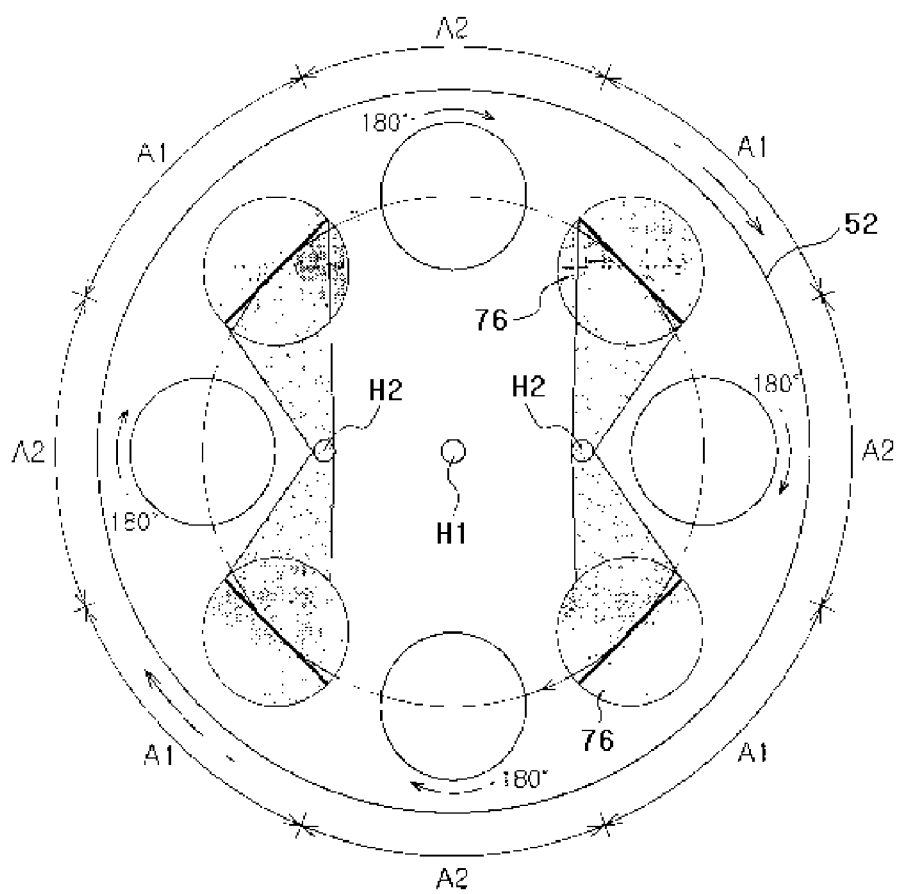

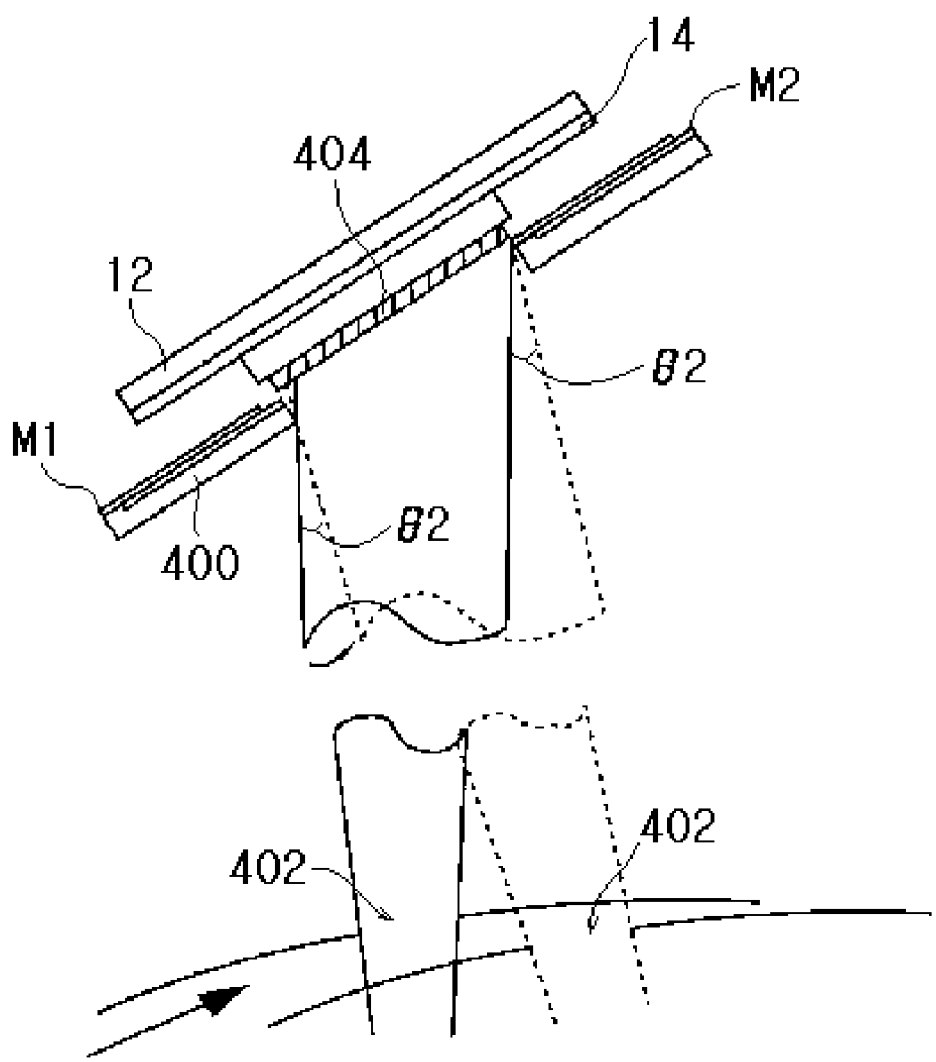
[Fig. 33]

[Fig. 34]
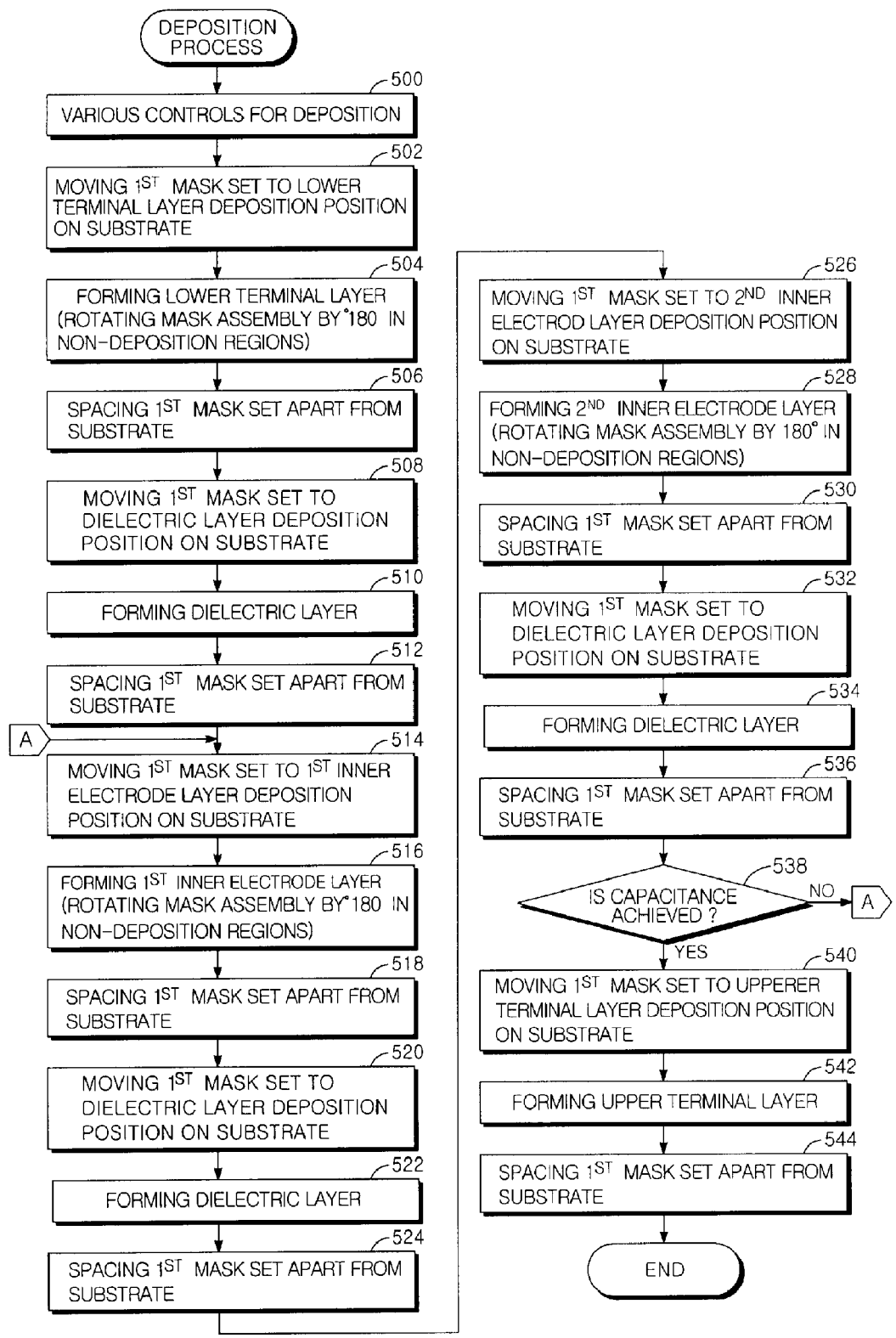

[Fig. 35]
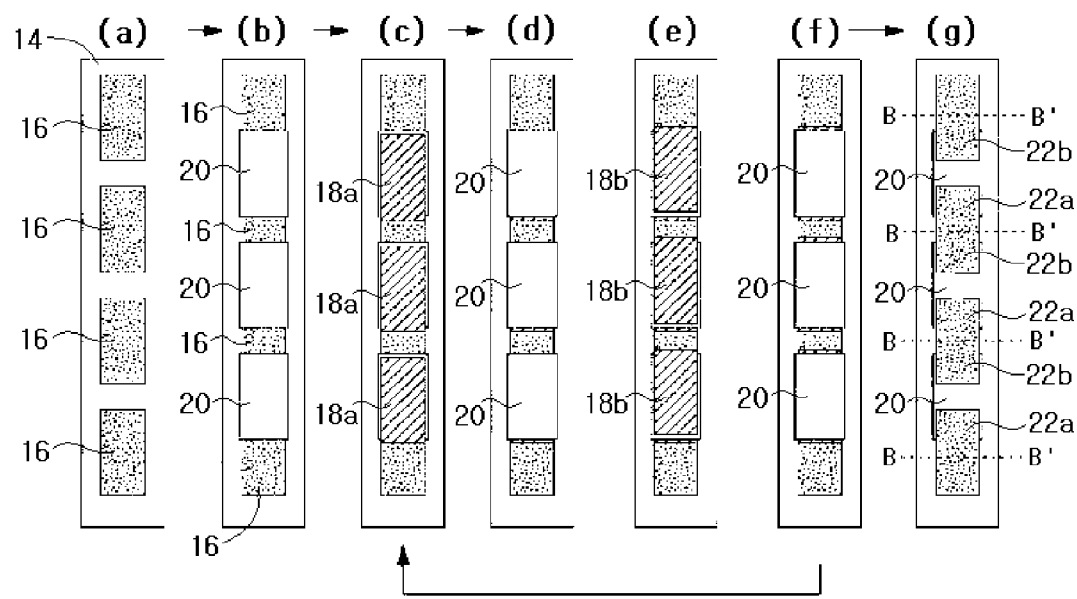
[Fig. 36]
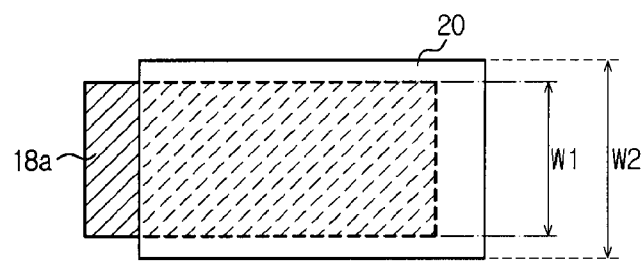

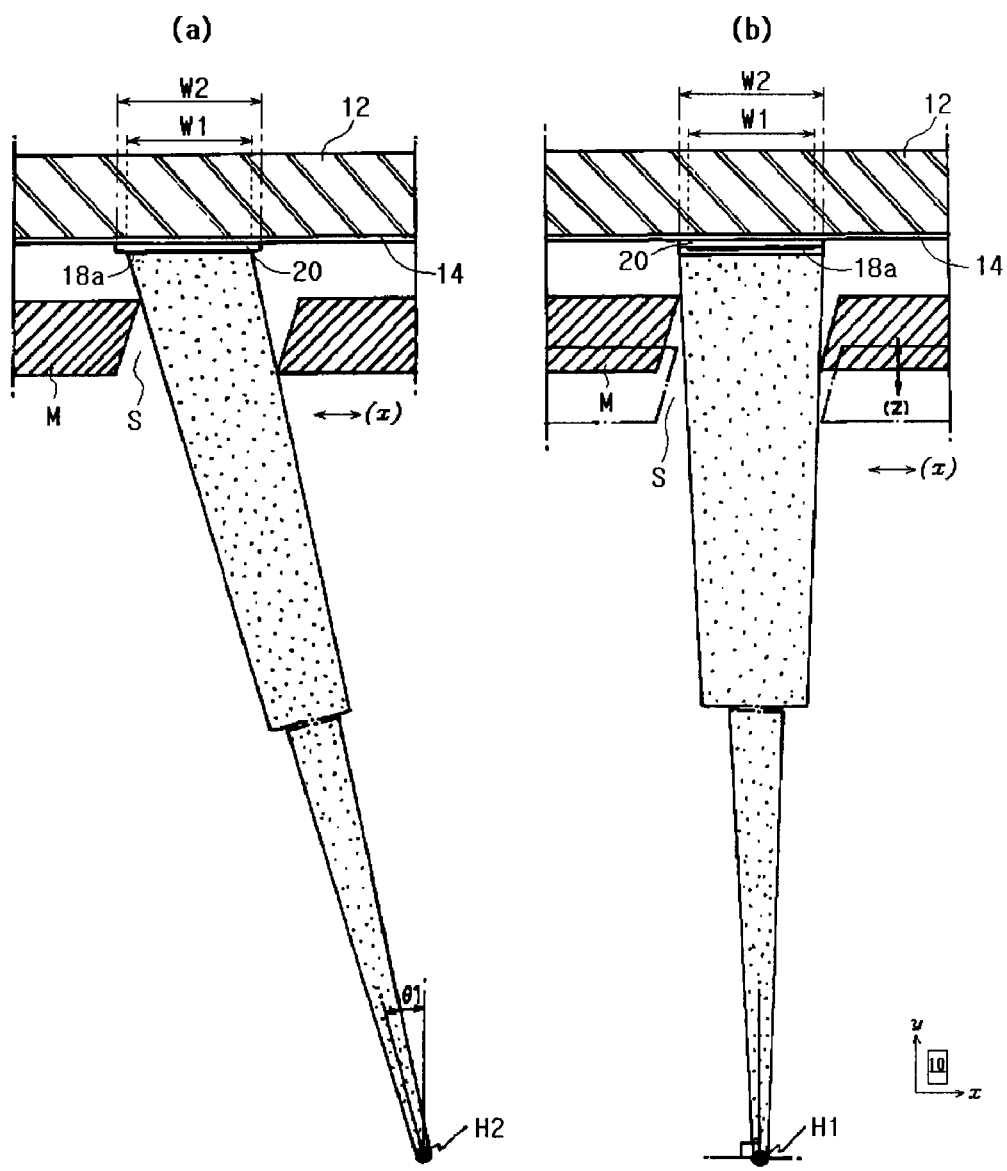

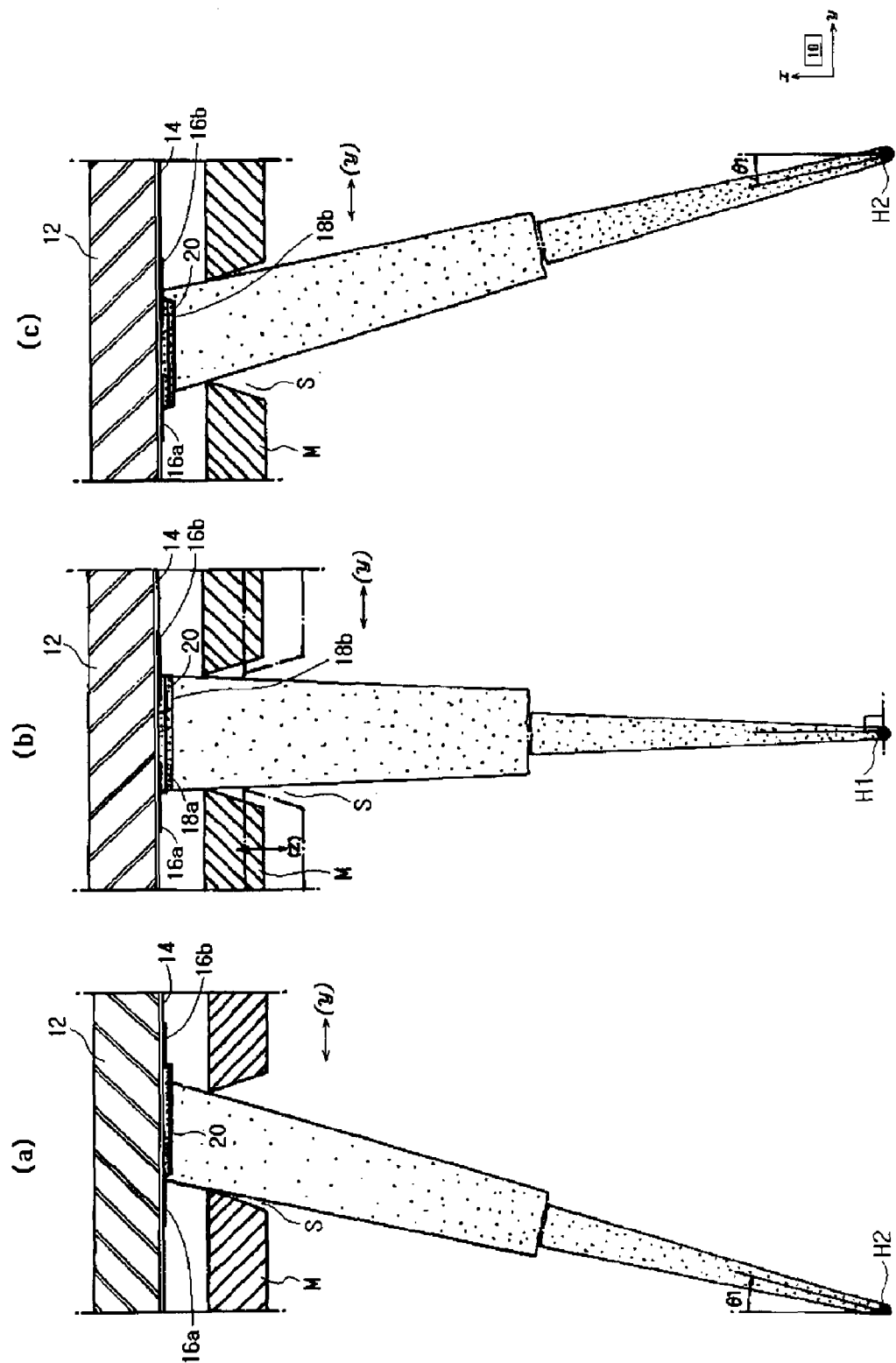
[Fig. 38]

[Fig. 39]
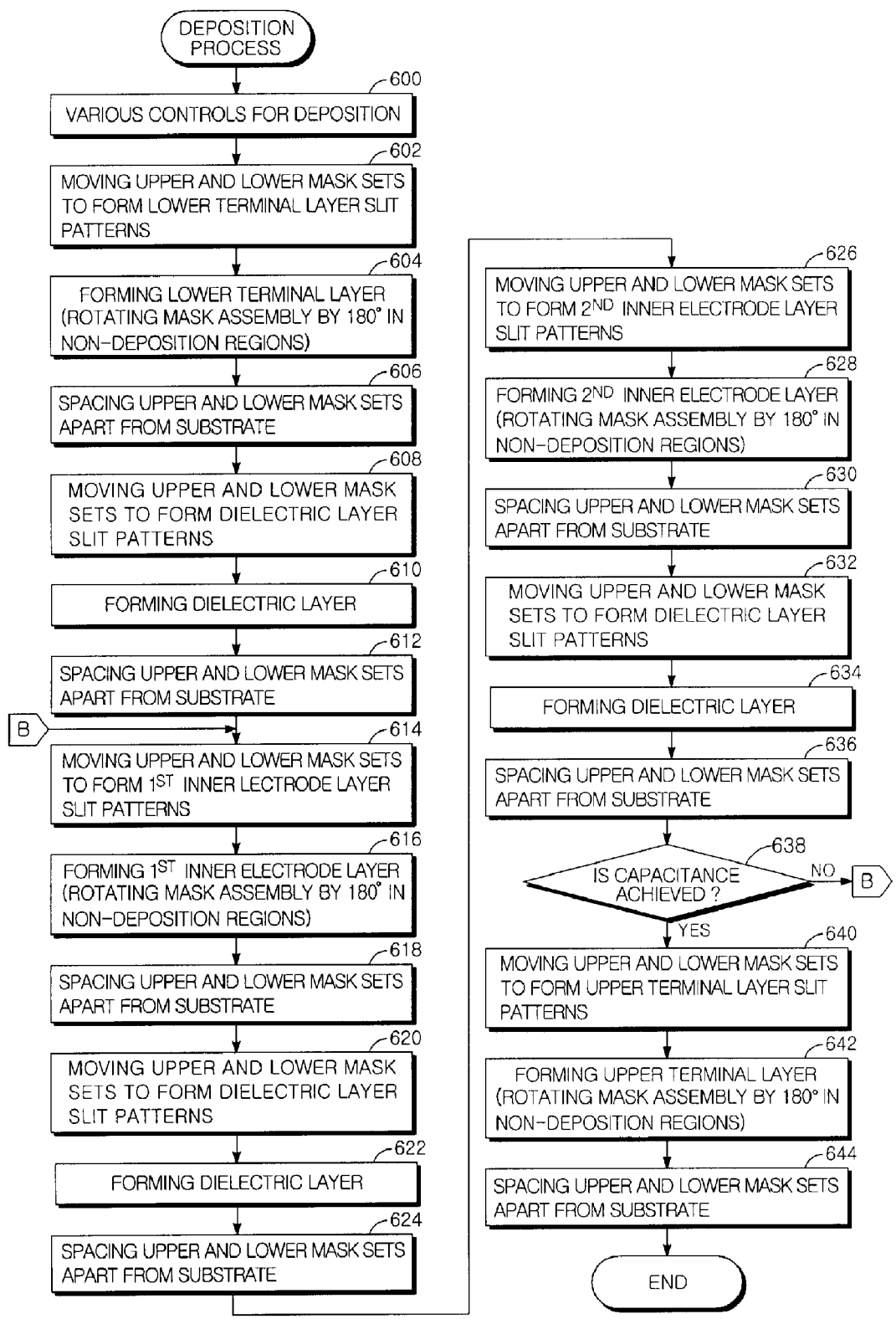

[Fig. 40]
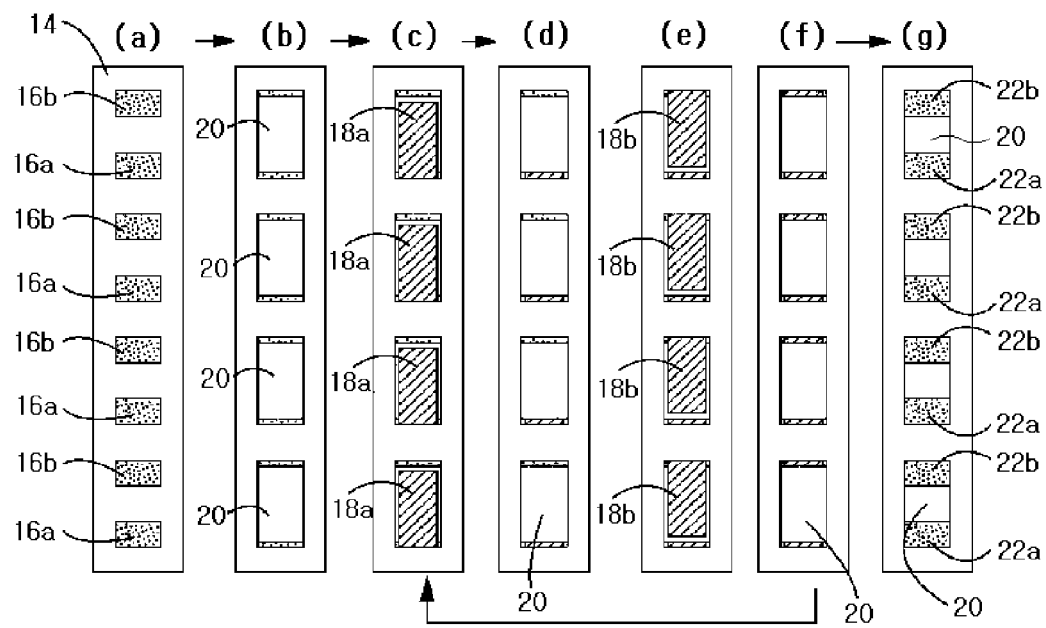
[Fig. 41]
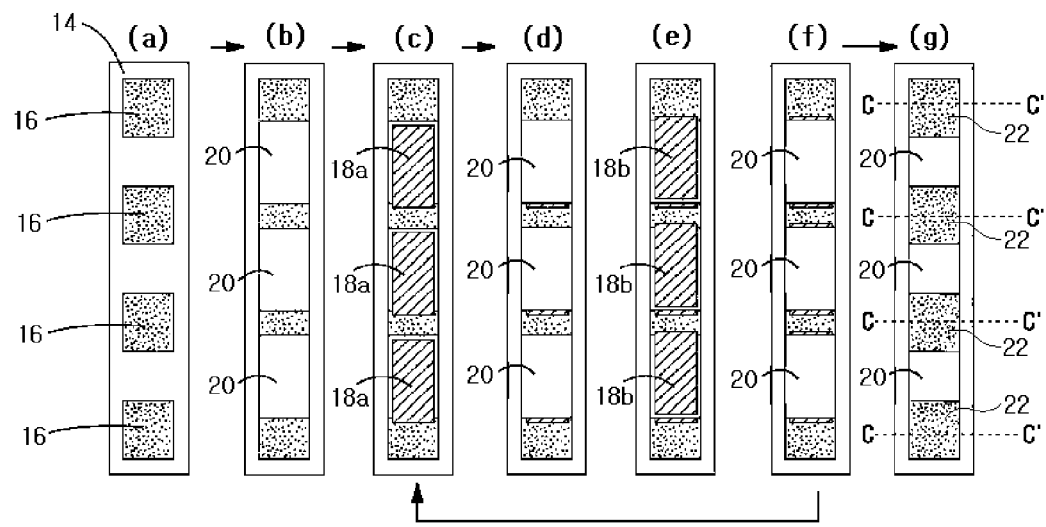

APPARATUS FOR MANUFACTURING A MULTILAYER CHIP CAPACITOR

TECHNICAL FIELD

The present invention relates to an apparatus for manufacturing a capacitor, and more particularly, to method and apparatus for manufacturing a multi-layer chip capacitor by vacuum vapor deposition.

BACKGROUND ART

Generally, in a portable electronic apparatus such as a personal digital assistant (PDA), a liquid crystal display (LCD), a plasma display panel (PDP), a mobile phone, an MP3 player, a memory, a digital camera, a camcorder, a multimedia player, or the like, circuit components are being gradually miniaturized in response to the trend of the portable electronic devices being miniaturized and multi-functional. Research for the miniaturization thereof is steadily continued recently.

A capacitor among the circuit components is difficult to miniaturize and to be made thin, but recently, a multi-layer chip capacitor, a capacitor whose required capacitance and breakdown voltage are maintained as volume is significantly reduced is being researched and developed.

A principal procedure of manufacturing a multi-layer chip capacitor in a conventional way will be described in a following example.

The multi-layer chip capacitor is manufactured by a mixing process of Wt % or mol % of powder of the main components and a binder of a dielectric layer and an inner electrode layer, a milling process for uniform distribution and miniaturization, a drying process or a printing process carried out for the dielectric layer according to a pattern, a binder drying process carried out after forming the dielectric layer, a spray drying process or a spray printing process carried out for the conductor layer according to the pattern, a binder drying process carried out after forming inner electrodes, a process of repeating the printing process and the drying process for achieving a predetermined capacitance, a sintering process of improving density of particles of a debinder, the dielectric layer, and the conductor layer carried out after achieving the required capacitance, a plating process of processing terminals, a terminal treatment process carried out by plating solution dipping, a soldering process as a post process, and a reliability testing process.

Meanwhile, the multi-layer chip capacitor may be manufactured by photolithography. The method of manufacturing the multi-layer chip capacitor using the photolithography is a method for forming the dielectric layer and a pattern of the inner electrode using the photolithography, and the multi-layer chip capacitor is completed by repeating process of coating a photoresistor, exposure, cleaning, etching, and removing the photoresistor whenever forming respective layers.

A cross-section of the multi-layer chip capacitor manufactured by the conventional method is depicted in FIG. 1.

As shown in FIG. 1, a conventional multi-layer chip capacitor 1 includes inner electrode layers 3 and 4 and a dielectric layer 2, which are alternately formed, and side electrodes 5 and 6 formed at the lateral sides thereof. The side electrodes 5 and 6 must be electrically connected to the inner electrode layers 3 and 4.

According to the conventional method, since the connection between the inner electrode layers 3 and 4 and the side electrodes 5 and 6 is complicated and difficult, a percent of defects caused by connection resistance is increased in the multi-layer chip capacitor whose high frequency characteristics are enhanced when the connection resistance is low. Moreover, since layer delamination is generated due to the expansion of fine bubbles in the layer during the sintering process, the percent of defects is high.

Moreover, in the conventional manufacturing process, since powder of the main components of the dielectric layer and the electrode layer must be nanoparticles, in order to miniaturize the multi-layer chip capacitor, manufacturing costs must be increased, the capacity of a system is reduced due to the complex manufacturing process, a wide installation space is required, and installation costs are increased.

On the other hand, a method of manufacturing the multi-layer chip capacitor by the thin film vacuum vapor deposition is being researched.

However, since the thin film vacuum vapor deposition requires at least two slit patterns for implementing the laminated layer structure of the multi-layer chip capacitor, a shadow mask having the slit pattern to suit every layer must be exchanged whenever forming respective layers. To this end, the vacuum process and the vacuum releasing process that require a relatively long time must be repeated, but since the introduction and mixing of impurities is caused each time the percent of defective products is increased and productivity is deteriorated.

DISCLOSURE OF INVENTION

Technical Problem

Therefore, the present invention has been made in view of the above and/or other problems, and it is an object of the present invention to provide apparatus and method for manufacturing a multi-layer chip capacitor to produce the multi-layer chip capacitors in commercial quantities by the vacuum vapor deposition and to reduce a percent of defects, and the multi-layer chip capacitor manufactured by the apparatus and the method.

It is another object of the present invention to provide apparatus and method for manufacturing multi-layer chip capacitors respectively having a lower electrode layer, a dielectric layer, an inner electrode layer, and an upper electrode layer at once within a vacuum mood which need only be generated once, and the multi-layer chip capacitor manufactured by the apparatus and the method.

It is still another object of the present invention to provide apparatus and method for manufacturing multi-layer chip capacitor without a process, of releasing vacuum and a process of vacuumizing again, required for the exchange of a shadow mask, and the multi-layer chip capacitor manufactured by the apparatus and the method.

It is still another object of the present invention to provide apparatus and method for manufacturing a multi-layer chip capacitor by a vacuum vapor deposition using a single shadow mask.

It is still another object of the present invention to provide apparatus and method for manufacturing a multi-layer chip capacitor by a vacuum vapor deposition by adjusting two slit patterns of a shadow mask.

Technical Solution

In accordance with the present invention, the above and other objects can be accomplished by the provision of a method of manufacturing a multi-layer chip capacitor by the vacuum deposition, the method including: carrying out the vacuum deposition by setting a deposition angle between a single mask set including a shadow mask having a plurality of slits and a deposition source and by controlling positions of the mask set in the X-, Y-, and Z-axes (the X?axis is the width direction, the Y-axis is the longitudinal direction, and the Z-axis is the height direction) to form a lower terminal layer, a dielectric layer, an inner electrode layer, and an upper terminal layer at once under a vacuum state generated once.

Another object of the present invention is achieved by the provision of a method of manufacturing a multi-layer chip capacitor by depositing a dielectric layer and a conductor layer in the form of multi-layer chip, while a width of the conductor layer is narrower than a width of the dielectric layer, including: positioning a dielectric layer deposition source to be perpendicular to a single shadow mask having a plurality of slits and a conductor layer deposition source to be oblique to the single shadow mask; and forming the dielectric layer and the conductor layer by evaporating evaporated particles from the respective deposition sources to pass through the slits and to be deposited on the substrate.

Another object of the present invention is achieved by the provision of a method of manufacturing a multi-layer chip capacitor by depositing a dielectric layer and a conductor layer in the form of multi-layer chip, while a width of the conductor layer is narrower than a width of the dielectric layer, including: adjusting and setting a distance between a single shadow mask installed to a mask set to be rotated and revolved and having a plurality of slits; positioning a dielectric layer deposition source to be perpendicular to the single shadow mask and a conductor layer deposition source to be oblique to the single shadow mask; and forming the dielectric layer and the conductor layer in the vacuum deposition while controlling the mask set to move along the X-, Y-, and Z-axes (the X-axis is the width direction, the Y-axis is the longitudinal direction, and the Z-axis is the height direction).

Another object of the present invention is achieved by the provision of a method of manufacturing a multi-layer chip capacitor by the vacuum deposition, the method including: adjusting slit patterns by relatively moving upper and lower mask sets that respectively include shadow masks having a plurality of slits and face each other to form a lower terminal layer, a dielectric layer, an inner electrode layer, and an upper terminal layer at once under a vacuum state generated once.

Another object of the present invention is achieved by the provision of a method of manufacturing a multi-layer chip capacitor by depositing a dielectric layer and a conductor layer in the form of multi-layer chip, while a width of the conductor layer is narrower than a width of the dielectric layer, including: forming slit patterns for forming desired deposition layers by moving upper and lower mask sets which respectively include shadow masks having a plurality of slits and face each other; and forming the dielectric layer and the conductor layer by evaporating evaporated particles from respective deposition sources to pass through the slit patterns and to be deposited on the substrate.

Another object of the present invention is achieved by the provision of a method of manufacturing a multi-layer chip capacitor by depositing a dielectric layer and a conductor layer in the form of multi-layer chip, while a width of the conductor layer is narrower than a width of the dielectric layer, including: adjusting and setting zero points of upper and lower shadow masks that are mounted in upper and lower mask sets to be rotated and revolved and respectively include a plurality of slits, and distances between the upper and lower shadow masks and the substrate; forming desired slit patterns using the upper and lower shadow masks by relatively moving the upper and lower mask sets; and forming the dielectric layer and the conductor layer in the vacuum deposition using the slit patterns.

Another object of the present invention is achieved by the provision of an apparatus for manufacturing a multi-layer chip capacitor under a high vacuum, including: a plurality of mask assemblies rotatably installed on a circumference of a revolving body mounted to revolve in the upper side in a chamber having vacuum deposition room; mask sets controlled to be moved along the X-, Y-, and Z-axes (the X-axis is the width direction, the Y-axis is the longitudinal direction, and the Z-axis is the height direction) by a horizontal mover and a vertical mover; a substrate positioned in the upper side of a shadow mask of the mask sets and parallel to the shadow mask; and a dielectric layer deposition source and a conductor layer deposition source installed on the bottom of the vacuum deposition room, wherein the dielectric layer deposition source is positioned perpendicular to the shadow mask and the conductor layer deposition source is positioned oblique to the shadow mask.

Another object of the present invention is achieved by the provision of an apparatus for manufacturing a multi-layer chip capacitor under a high vacuum, including: a plurality of mask assemblies rotatably installed on a circumference of a revolving body that revolves in the upper side of a chamber having a vacuum deposition room by a shaft; upper and lower mask sets facing each other and moved by a horizontal mover and a vertical mover along the X-, Y-, and Z-axes (the X-axis is the width direction, the Y-axis is the longitudinal direction, and the Z-axis is the height direction); a substrate installed above shadow masks of the upper and lower mask sets to be parallel to the shadow masks, while the shadow masks of the upper and lower mask sets are moved to form slit patterns; and a dielectric layer deposition source, a conductor layer deposition source, and respective deposition source evaporators thereof, installed on the bottom of the vacuum deposition room such that particles evaporated from the deposition sources pass through the slit patterns to be deposited on the substrate.

Advantageous Effects

As described above, according to the present invention, a substrate and a single shadow mask or two shadow masks are mounted and a deposition angle and a slit pattern are formed on a mask assembly which can rotate, revolve, and move along X-axis, Y-axis, or Z-axis, so that a high quality multi-layer chip capacitor can be manufactured in the vacuum deposition.

BRIEF DESCRIPTION OF THE DRAWINGS

FIG. 1 illustrates a sectional view of a conventional multi-layer chip capacitor;

FIG. 2 is a flowchart illustrating a pre-process according to an embodiment of the present invention;

FIG. 3 is a flowchart illustrating a main process according to the embodiment of the present invention;

FIG. 4 is a flowchart illustrating a post-process according to the embodiment of the present invention;

FIG. 5 illustrates a sectional view of a multi-layer chip capacitor according to the embodiment of the present invention;

FIG. 6 is a view illustrating a configuration of an apparatus for manufacturing a multi-layer chip capacitor according to the embodiment of the present invention;

FIG. 7 is a schematic plan view of the apparatus in FIG. 6;

FIG. 8 is a detailed sectional view of a non-contact power supply 87 installed above a circular track shown in FIG. 6;

FIG. 9 is a sectional view of a cassette 70 according to a first embodiment of the present invention;

FIG. 10 is a sectional view of a cassette 70 according to a second embodiment of the present invention;

FIG. 11 is a circuit block diagram of a cassette controller 79 in the cassette;

FIG. 12 is a perspective view illustrating a mask set according to a first embodiment of the present invention;

FIG. 13 is a perspective illustrating an assembly of upper and lower mask sets according to a second embodiment of the present invention;

FIG. 14 is a plan view illustrating an example of a shadow mask according to the embodiment of the present invention;

FIG. 15 is a partially sectional view of a holding frame 142 of the lower mask set 132b among the upper and lower mask sets 132a and 132b taken along the line A-A;

FIG. 16 is a vertical sectional view illustrating the relationship between the shadow mask M and the slits S according to the first embodiment of the present invention;

FIG. 17 is a vertical sectional view illustrating the relationship between the shadow masks M1 and M2 and the slits S according to the second embodiment of the present invention;

FIGS. 18 to 24 are enlarged views illustrating various examples of slit patterns formed by the relative movement of the upper and lower mask sets 132a and 132b according to the second embodiment of the present invention;

FIG. 25 is a front sectional view of a dielectric substance source feeder 80 in FIG. 6;

FIG. 26 is an enlarged and exploded perspective view of a portion E in FIG. 25;

FIG. 27 is a view illustrating the comparison of the formation of a conventional deposited layer with the formation of a deposited layer according to the embodiment of the present invention when $ABO_3$ type ferroelectrics are used as the dielectric deposition source;

FIG. 28 is a perspective view illustrating an example of a dielectric deposition source having dielectric multi-deposition sources;

FIG. 29 is a front sectional view of conductor source feeders 82a and 82b in FIG. 6;

FIG. 30 is a partial perspective view illustrating a portion F in FIG. 31;

FIG. 31 is a view illustrating an evaporation range of the deposition source and the controlled state when the dielectric layer is formed according to the embodiment of the present invention;

FIG. 32 is a view illustrating an evaporation range of the deposition source and the controlled state when the inner electrode layer and the electrode layer are formed according to the embodiment of the present invention;

FIG. 33 is a view illustrating operation of conductor hatches 86;

FIG. 34 a detailed flowchart illustrating the deposition process of the main process according to the first embodiment of the present invention;

FIG. 35 is a view illustrating a process of manufacturing the multi-layer chip capacitor during the deposition process of the main process according to the first embodiment of the present invention;

FIG. 36 is an enlarged view illustrating the deposited conductor layer and dielectric layer according to the first embodiment of the present invention;

FIG. 37 is a sectional view illustrating the deposition carried out in the width direction (the X-axis) in the first embodiment of the present invention;

FIG. 38 is a sectional view illustrating the deposition carried out in the longitudinal direction (the Y-axis) in the first embodiment of the present invention;

FIG. 39 is a detailed flowchart illustrating the deposition process of the main process according to the second embodiment of the present invention; and FIGS. 40 and 41 are views illustrating a process of manufacturing a multi-layer chip capacitor during the deposition process of the main process according to the second embodiment of the present invention.

BEST MODE FOR CARRYING OUT THE INVENTION

Hereinafter, embodiments of the present invention will be described with reference to the accompanying drawings. It should be pointed out that the same numerals in the drawings are assigned to the same components. Moreover, the description for the conventional function and structure that may confuse spirit of the present invention will be omitted.

In the present invention, the method of manufacturing a multi-layer chip capacitor is implemented by a vacuum deposition. Particularly, the method according to the embodiments is implemented for multi-layer chip capacitors respectively including a lower electrode layer, a dielectric layer, an inner electrode layer, and an upper electrode layer at once under a vacuum which need only be generated once.

The method of manufacturing a multi-layer chip capacitor according to the embodiment of the present invention includes a method of manufacturing a multi-layer chip capacitor by using a single shadow mask and adjusting a deposition angle according to a first embodiment of the present invention, and a method of manufacturing a multi-layer chip capacitor by using two shadow masks and adjusting slit patterns of the masks.

The manufacturing method according to the first embodiment of the present invention carries out the vacuum deposition by setting the deposition angle between the shadow mask and a deposition source of a single mask set including the shadow mask having a plurality of slits to manufacture the multi-layer chip capacitors including a lower electrode layer, a dielectric layer, an inner electrode layer, and an upper electrode layer at once under a vacuum which need only be generated once.

The manufacturing method according to the second embodiment of the present invention adjusts slit patterns by relatively moving upper and lower mask sets which respectively include a shadow mask having a plurality of slits and are installed to face each other such that multi-layer chip capacitors including a lower electrode layer, a dielectric layer, an inner electrode layer, and an upper electrode layer are manufactured at once under a vacuum which need only be generated once.

The overall process of manufacturing the multi-layer chip capacitor according to the embodiment of the present invention may be roughly divided into a pre-process, a main process, and a post-process.

FIG. 2 is a flowchart illustrating a pre-process S1 according to the embodiment of the present invention, FIG. 3 is a flowchart illustrating the main process S2 according to the embodiment of the present invention, and FIG. 4 is a flowchart illustrating the post-process S3 according to the embodiment of the present invention.

FIG. 5 illustrates a sectional view of the multi-layer chip capacitor manufactured by the main process S2 according to the embodiment of the present invention.

In the multi-layer chip capacitor 10 in FIG. 5, a reference numeral 12 is assigned to a substrate, a reference numeral 14 is assigned to a releasing layer, and reference numerals 16a and 16b are assigned to first and second lower terminal layers. Reference numerals 18a and 18b are assigned to first and second inner electrode layers, a reference numeral 20 is assigned to the dielectric layer, reference numerals 22a and 22b are assigned to first and second upper terminal layers. The first lower and upper terminal layers 16a and 22a and the first and second inner electrode layers 18a and 18b all correspond to the conductor layers.

In the multi-layer chip capacitor 10 according to the embodiment of the present invention shown in FIG. 5, differently from the conventional multi-layer chip capacitor, side electrodes are not formed. In other words, a side of the first inner electrode layer 18a is extended to the first lower terminal layer 16a to be electrically connected to the first lower and upper terminal layers 16a and 22a, and the opposite side of the second inner electrode layer 18b is extended to the second lower terminal layer 16b to be electrically connected to the second lower and upper terminal layers 16b and 22b. By doing so, the connection process and the jumper process of electrically connecting the side electrodes to the inner electrode layers can be omitted.

Moreover, the dielectric layer 20 positioned between the first inner electrode layer 18a and the second inner electrode layer 18b has a wide width relative to those of the first and second inner electrode layers 18a and 18b (See FIG. 36).

The pre-process S1 according to the embodiment of the present invention is a preparation process for the vacuum deposition, and as shown in FIG. 2, is carried out by the order of a substrate cleaning process S20, a releasing layer coating process S22, a setting process S24, and a mounting process S26.

The pre-process S1 will be described in detail as follows.

Firstly, during the substrate cleaning process S20, a contaminant layer on the substrate 12 to be used in the vacuum deposition is removed by the ultrasonic cleaning, alcohol cleaning, a nitrogen gas spray cleaning, and ion bombardment. During the releasing layer coating process S22 carried out after that, a thermally decomposable releasing layer 14 is coated on the cleaned substrate 12 by any one of the spin coating, the spray coating, and the print coating, and is dried.

After that, the setting process S24 is carried out. The setting process S24 is differently carried out according to the first embodiment of the present invention using a single shadow mask and the second embodiment of the present invention using two shadow masks.

Firstly, in the first embodiment of the present invention using a single shadow mask, the substrate 12 coated with the releasing layer 14 and the mask set are assembled into a mask assembly, and the distance between the substrate 12 and the single shadow mask is adjusted and set. In the second embodiment of the present invention using two shadow masks, the substrate 12 coated with the releasing layer 14 and the upper and lower mask sets are assembled into the mask assembly, and the zero points of the upper and lower mask sets and the distance between the upper and lower mask sets and the substrate 12 are adjusted and set.

After the setting process S24, the final process of the pre-process S1, that is, the mounting process S26 is carried out.

The mounting process S26 is a process of inserting the first and second lower terminal layers 16a and 16b and the electrode layer deposition sources used to form the first and second upper terminal layers 22a and 22b in FIG. 5, a dielectric layer deposition source used to form the dielectric layer 20 in FIG. 5, inner electrode layer deposition sources used to form the first and second inner electrode layers in FIG. 5, and a buffering layer deposition source as needed into conductor source feeders 82a and 82b and a dielectric substance source feeder 80, installed in a chamber 52 of a multi-layer chip capacitor manufacturing apparatus 50 that will be described later together with FIG. 6, respectively, and mounting the mask assemblies 76 to cassette control units 74 in the chamber 52.

Next, the main process S2 according to the embodiment of the present invention will be described with reference to FIG. 3 as follows.

The main process S2 is a process of forming the first and second lower terminal layers 16a and 16b, the first and second electrode layers 18a and 18b, the first and second upper terminal layers 22a and 22b of the multi-layer chip capacitor 10 by the vacuum deposition, and is carried out within the chamber 52 of the multi-layer chip capacitor manufacturing apparatus 50 in FIG. 6. The main process S2, as shown in FIG. 3, is carried out according to the order of a vacuumizing process S30, a substrate pre-heating process S32, a deposition process S34, and a vacuum releasing process S36.

The vacuumizing process S30 of the main process S2 is a process of vacuumizing the inside of the chamber 52 (See FIG. 6), and the substrate pre-heating process S32, carried out after that, is a process of pre-heating the substrate 12 coated with the releasing layer 14 and is provided in the pre-process S1 to improve the layer quality of the deposited layer.

The deposition process S34, an essential process of the main process S2, is carried out after the substrate pre-heating process S32, and forms the first and second lower terminal layers 16a and 16b, the dielectric layer 20, the first and second inner electrode layers 18a and 18b, and the first and second upper terminal layers 22a and 22b of the multi-layer chip capacitor 10 by the vacuum deposition.

The deposition process S34 is carried out in two ways in the present invention. The first one is to manufacture the multi-layer chip capacitor 10 by using a single shadow mask and adjusting a deposition angle thereof, and is the method according to the first embodiment of the present invention. The second one is to manufacture the multi-layer chip capacitor 10 by using two shadow masks and adjusting slit patterns, and is the method according to the second embodiment of the present invention.

When the multi-layer chip capacitor 10 is manufactured by the deposition process S34, the vacuum releasing process S36 is carried out. The vacuum releasing process S36 is a process of releasing vacuum in the chamber 52.

After carrying out the main process S2, the post-process S3 is carried out.

The post-process S3 is a series of processes of completing the multi-layer chip capacitor 10 into a final product by the post-treatment.

The post-process S3, as shown in FIG. 4, is carried out according to the order of a substrate separating process S40, a heat treatment furnace inserting process S42, a thermal treatment process S44, a cooling process S46, and a testing process S48.

The substrate separating process S40 is a process of separating the substrate 12 on which the deposition is completed from the mask assemblies 76, and after that, the heat treatment furnace inserting process S42 and the thermal treatment process S44 are carried out.

In the heat treatment furnace inserting process S42, the substrate 12, on which the deposition of the multi-layer chip capacitor 10 is finished, is inserted into a heat treatment furnace while the heat treatment furnace is vacuumized and active gas or inert gas is introduced into the heat treatment furnace such that a pressure in the heat treatment furnace is slightly lower than the atmospheric pressure.

Next, in the heat treatment process S44, heat of 300 degrees centigrade to 700 degrees centigrade is applied such that the substrate 12 and the multi-layer chip capacitor 10 are separated from each other due to the thermal decomposition and the composition of the multi-layer chip capacitor 10 is crystallized and annealed.

After that, in the cooling process S36, the substrate 12, which has passed the heat treatment process S44, and the multi-layer chip capacitor 10 are annealed. Finally, in the testing process S46, the reliability test of the finished multi-layer chip capacitor 10 is carried out.

Moreover, in the post-process S3, if necessary, a soldering process and a labeling process of the multi-layer chip capacitor 10 may be further carried out before the testing process S46.

FIG. 6 is a view illustrating a configuration of an apparatus 50 for manufacturing a multi-layer chip capacitor according to the embodiment of the present invention, and carries out the main process S2 in FIG. 3. FIG. 7 is a schematic plan view of the apparatus in FIG. 6.

The apparatus 50 for manufacturing a multi-layer chip capacitor according to the embodiment of the present invention is implemented to minimize the inferiority of the multi-layer chip capacitor 10 when manufacturing the same and to produce the multi-layer chip capacitors 10 in commercial quantities. Particularly, the apparatus 50 for manufacturing a multi-layer chip capacitor is implemented such that mask assemblies 76 can be rotated and revolved within a vacuum deposition room 54 and a mask set (130 in FIG. 9 and 132a and 132b in FIG. 10) can move horizontally (in the width direction=the X-axis, and in the longitudinal direction=the Y-axis) and vertically (in the height direction=the Z-axis). Thus, under the vacuum which need only be generated once, the multi-layer chip capacitor can be deposited at once.

Referring to FIGS. 6 and 7, the apparatus 50 for manufacturing a multi-layer chip capacitor includes a chamber 52 having a vacuum deposition room 54 and a plurality of vacuum controllers 56 installed at a side of the chamber 52 to vacuumize or release the vacuum in the chamber 52. Each of the vacuum controllers 56 includes a gate valve 58. The vacuum controllers 56 carry out the vacuum control using the gate valves 58 such that the vacuum deposition is carried out in the chamber 52. Preferably, the vacuum degree in the chamber 52 for the vacuum deposition ranges 10-3 torr to 10-7 torr.

At the upper outer side of the chamber 52, a revolution driving unit 60 including a servo-motor, a reducer, and gears is installed to revolve a revolving body 64 mounted around a revolving shaft 62 of the chamber 52. In short, the revolution driving unit 60 generates a revolving force, and the revolving force is transmitted to the revolving shaft 62 through the gears. Since the revolving body 64 positioned in the upper side within the chamber 52 is mounted around the revolving shaft 62, the revolving body 64 revolves about the revolving shaft 62.

Since the outer edge of the revolving body 64 is bent to form a guide 66 such that the revolving body 64 is supported to be slid on a circular track installed in the upper side of the vacuum deposition room 54, the revolving body 64 is easily revolved.

Plural cassettes 70 are mounted around respective rotating shafts 72 along the outer circumference of a ceiling of the revolving body 64 about the respective rotation shafts 72. Each of the plural cassettes 70 includes the mask assembly 76 and the cassette control unit 74 for overall control of the cassette 70 including the mask assembly 76. The mask assemblies 76 are implemented to be attached to and detached from the cassette control units 74 by coupling devices 78.

Meanwhile, on the bottom of the vacuum deposition room 54 of the chamber 52, a single dielectric substance source feeder 80 having a dielectric layer deposition source (H1 in FIG, 25) and two conductor source feeders 82a and 82b having conductor layer deposition sources (H2 and H3 in FIG. 29) are installed. The dielectric substance source feeder 80 is installed such that the evaporation position of the dielectric layer deposition source H1 is positioned at the bottom center of the vacuum deposition room in the chamber 52, and the two conductor source feeders 82a and 82b are installed at the lateral sides of the dielectric substance source feeder 80. In the vicinity of the respective the conductor source feeders 82a and 82b, conductor evaporators 84a and 84b are provided. The reason to position the dielectric layer deposition source H1 at the bottom center of the vacuum deposition room 54 is to make the evaporation direction of the dielectric layer deposition source H1 perpendicular to the shadow mask. Thus, the conductor layer deposition sources H2 positioned at the lateral sides of the dielectric layer deposition source H1 form a predetermined oblique angle with respect to a direction perpendicular to the surface of the shadow mask parallel to the substrate.

In FIG. 6, reference numeral 86 is assigned to conductor hatches. The conductor hatches 86 are respectively installed around the conductor source feeder 82a and the conductor evaporator 84a which are positioned at the side of the dielectric substance source feeder 80 and around the conductor source feeder 82b and the conductor evaporator 84b which are positioned at the opposite side of the dielectric substance source feeder 80, and is controlled by a main controller such that a conductor layer is deposited only in a predetermined region and the thickness of the deposited layer of the conductor is uniform. The conductor hatches 86 include dome-shaped dual layer covers respectively having openings (402 in FIG. 33), wherein each of the covers is individually operated. Thus, due to the relative operation of the dual layer covers, the openings 402 may be opened and closed and the opening degrees of the openings 402 are adjusted when opening the openings 402.

The dielectric substance source feeder 80 and the conductor source feeders 82a and 82b supply deposition source for forming the upper and lower terminal layers 22a, 22b, 16a, and 16b, the dielectric layer 20, and the first and second inner electrode layers 18a and 18b of the multi-layer chip capacitor 10 according to the embodiment of the present invention. A dielectric substance evaporator (not shown) is installed at a side of the dielectric substance source feeder 80 and conductor evaporators 85 are respectively installed at the sides of the conductor source feeders 82a and 82b in the conductor hatches 86, such that heat sources of the respective deposition sources are supplied.

At the lower side of the vacuum deposition room 54 in the chamber 52, plasma beam projectors 88 are installed vertically or obliquely with respect to the bottom to project plasma beams. The plasma beams projected from the plasma beam projectors 88 are utilized for the purpose of improving the quality of the deposited layers and of ionizing and accelerating gas being mixed with the evaporated sources.

Although the embodiment of the present invention uses electronic beam as an evaporating means employed in the conductor evaporators 84a and 84b and a dielectric substance evaporator (not shown) for the vacuum deposition, it should be pointed out that ion beam, high frequency sputtering, plasma sputtering, ion cluster, ion plating, or the like can be utilized.

Moreover, cooling water lines (not shown) for cooling radiant heat due to the heat sources are installed here and there in the apparatus for manufacturing a multi-layer chip capacitor. In other words, the cooling water lines are installed in the chamber 52, the conductor source feeders and the dielectric substance source feeder 82a, 82b and 80, the cassette control unit 74, the vacuum controllers 56, the plasma beam projectors 88, the conductor evaporators 84, and the dielectric substance evaporator (not shown).

Moreover, the apparatus 50 for manufacturing a multi-layer chip capacitor depicted in FIG. 6 includes a non-contact power supply 90 for supplying electric power to the cassette control units 74 in the chamber 52, which is installed above the circular track 68.

FIG. 8 is a detailed sectional view of a non-contact power supply 87 installed on the upper side of the circular track 68 shown in FIG. 6.

As shown in FIG. 8, the non-contact power supply 90 includes an insulator supporting rod 91, a primary coil 92 made of a copper pipe, a core 93, and a secondary coil 94, while the primary coil 92 does not contact the secondary coil 94.

When constructing the non-contact power supply 90, the insulator support 91 in which the primary coil 92 is installed in protrusions thereof is coupled to a chamber wall 52a above the circular track 68, and the core 93 and the secondary coil 94 are coupled to the revolving body 64 using a bracket 95. By doing so, when the revolving body 64 revolves, the core 93 and the second coil 94 coupled to the revolving body 64 revolve together, while the secondary coil 94 approaches the primary coil 92 of the support 91 fixed to the chamber wall 52a but does not contact the same. Because of this, the electric power supplied from the exterior is applied to the primary coil 92 of the non-contact power supply 90, and the external electric power is induced from the primary coil 92 to the secondary coil 94 in a non-contact way to be supplied to the cassette control units 74.

Referring to FIGS. 5 and 6 again, the plural cassettes 70, which rotate about the respective rotating shafts 72 installed on the outer circumference of the ceiling of the revolving body 64, is structured as shown in FIGS. 9 and 10 according to the first and second embodiments of the present invention.

FIG. 9 is a sectional view of a cassette 70 according to the first embodiment of the present invention, and FIG. 10 is a sectional view of a cassette 70 according to the second embodiment of the present invention.

FIG. 11 is a circuit block diagram of a cassette control unit 74 in the cassettes 70 employed in the first and second embodiments of the present invention.

The cassette 70, depicted in FIG. 9, according to the first embodiment of the present invention is structured such that a single shadow mask is mounted within a mask assembly 76 and the position of the single shadow mask is controlled to carry out the vacuum deposition of the multi-layer chip capacitor 10 on the substrate 12 as shown in FIG. 5. Moreover, the cassette 70, depicted in FIG. 10, according to the second embodiment of the present invention is structured such that two shadow masks, that is, an upper shadow mask and a lower shadow mask are mounted within the mask assembly 76 and the positions of the upper and lower shadow masks are controlled to carry out the vacuum deposition of the multi-layer chip capacitor 10 on the substrate 12 as shown in FIG. 5.

Referring to FIGS. 9, 10, and 11, the cassette 70 roughly includes a cassette control unit 74 and the mask assembly 76.

The cassette control unit 74, as shown in FIG. 11, includes a cooling system for cooling a variety of circuit components in a case 102 sealed by a rubber O-ring or a copper gasket and the interior of the case 102.

In detail, the case 102 of the cassette control unit 74 depicted in FIG. 11, includes a power line communication unit and programmable logic controller (PLC) 104, a motor controller 106, a heater controller 108, a rectifier 110, and a radio frequency bias generator 112, and a lower plate 114 of the case 102 of the cassette control unit 74 is structured as a cooling plate such that cooling water is supplied and circulated to prevent the cassette control unit 74 from being overheated.

The power line communication unit and PLC 104 is a wireless circuit for interfacing a radio signal with the exterior of the chamber 52, and the motor controller 106 is a circuit for controlling a variety of motors installed in the cassettes 70. Moreover, the heater controller 108 is a circuit for controlling a heater 118 mounted on a substrate fixing plate 116 of the mask assembly 76, and the rectifier 110 rectifies alternating current electric power supplied from the non-contact power supply 90 to supply the rectified alternating current electric power an appropriate operating voltage. The radio frequency bias generator 112 is a circuit for generating a radio frequency bias voltage. The radio frequency bias voltage generated from the radio frequency bias generator 112 is applied to the substrate 12 of the mask assembly 76 and causes the evaporated particles to be accelerated and deposited on the substrate 12 when carrying out the vacuum deposition. These operations enable the respective layers of the multi-layer chip capacitor 10 to be crystallized at low temperature and to be formed in high density.

As shown in FIG. 11, on the lower plate 114 of the cassette control unit 74, a vacuum connection terminal 120 is formed and is electrically connected to a vacuum connection terminal formed on the fixing plate 122 of the mask assembly 74 in FIGS. 9 and 10 that is coupled to the lower side of the lower plate 114. Thus, the mask assembly 76 is electrically connected to the cassette control unit 76 such that a variety of components in the mask assembly 76, that is, a linear motor of a vertical mover 124 or a horizontal mover 126, a variety of sensors for detecting operation of the respective units such as the deposition position, the traveled position, and the like of the shadow mask, a thermocouple gauge (T.C gauge), and the heater 118 operate well.

Referring to FIGS. 9 and 10 again, the mask assembly 76 is installed in the lower side of the cassette control unit 74. The mask assembly 76 is structured such that the substrate 12 to be deposited is mounted therein and a single shadow mask or two shadow masks approach extremely close to the substrate 12 parallel to the substrate 12. Moreover, the mask set (130 in FIG. 9, 132a and 132b in FIG. 10) on which the single shadow mask or the two shadow masks are mounted may be moved horizontally (in the width direction=the X-axis, and in the longitudinal direction=the Y-axis) and vertically (in the height direction=the Z-axis).

In detail, the fixing plate 122 of the mask assembly 76 is fixed to the lower surface of the case 102 of the cassette control unit 74 by a plurality of coupling devices 123 such as rings, fixing pins, or the like. A plurality of vertical movers 124 is fixed to the fixing plate 122. Each of the vertical movers 124 moves the single mask set 130, according to the first embodiment of the present invention as shown in FIG. 9, or the two mask sets, according to the second embodiment of the present invention as shown in FIG. 10, that is, the upper and lower mask sets 132a and 132b, in the vertical direction (the Z-axis) independently.

Moreover, on the respective lower surfaces of the plural vertical movers 124, respective moving tables 125 are coupled, and the horizontal movers 126 are installed to the respective moving tables 125 to horizontally move in the width direction (the X-axis) and in the longitudinal direction (the Y-axis). The horizontal movers 126 serve to horizontally move the single mask set in FIG. 9 and the two mask sets 132a and 132b in FIG. 10 in the width direction (the X-axis) or in the longitudinal direction (the Y-axis). Due to the horizontal movement control of the two mask sets 132a and 132b in the width direction (the X-axis) or in the longitudinal direction (the Y-axis), a variety of slit patterns according to the second embodiment of the present invention can be formed.

The single mask set 130 in FIG. 9, as clearly shown in the perspective view of FIG. 12, includes a single shadow mask M and a holding frame 136 for holding the shadow mask M, while connecting rods 138 of the holding frame 136 are coupled with a lower plate 127 of the horizontal mover 126 in FIG. 9.

The upper and lower mask sets 132a and 132b in FIG. 10, as clearly shown in the perspective view of FIG. 13, include upper and lower shadow masks M1 and M2 and upper and lower holding frames for respectively holding the shadow masks M1 and M2, while connecting rods 144 of the upper holding frame 140 are coupled with the lower plate 127 of the horizontal mover 126 in FIG. 10. However, operating rods 146 of the lower holding frame 142 penetrate guide slots 148 of the upper holding frame 140 and are coupled with another lower plate 147 of the horizontal mover 126 that is not coupled with the connecting rods 144 as shown in FIG. 10.

Due to the coupling structures of the upper and lower mask sets 132a and 132b, the distance between the lower shadow mask M2 and the upper shadow mask M1 can be relatively adjusted in the height direction (the Z-axis), in the width direction (the X-axis), and in the longitudinal direction (the Y-axis). The relative position adjustments in the width direction (the X-axis) and in the longitudinal direction (the Y-axis) are carried out within the guide slots 126 of the holding frame 14.

In FIGS. 12 and 13, reference numeral 150 is assigned to fixing screws of the holding frame 136. The structure of the holding frame 136 for holding the shadow masks M, M1, and M2 will be described in detail later with reference to FIG. 15.

The plan structures of the single shadow mask M depicted in FIG. 12 and the upper and lower shadow masks M1 and M2 depicted in FIG. 13 are shown in FIG. 14.

Referring to FIG. 14, the shadow masks M, M1, and M2 have a structure in which a variety of slits S are arranged in a metal sheet at predetermined intervals. The evaporated particles evaporated and flown from the deposition sources during the vacuum deposition pass through the respective slits S and are deposited on the substrate 12 to form the deposition layer. Since a single multi-layer chip capacitor 10 can be manufactured by a single slit S or two slits S in the embodiment of the present invention, it must be understood that many multi-layer chip capacitors 10 can be manufactured from a single substrate 12 at once.

The formation of the slits S of the shadow masks M, M1, and M2 will be described later in detail with reference to FIGS. 16 and 17.

FIG. 15 is a partially sectional view of the holding frame 142 of the lower mask set 132b among the upper and lower mask sets 132a and 132b in FIG. 13 taken along the line A-A'.

It should be pointed out that the partial cross-section of the holding frame 140 of the lower mask set 132b in FIG. 15 described later is identical to the cross-sections of the holding frame 136 of the mask set in FIG. 12 and the holding frame 140 of the upper mask set 132a in FIG. 13. In this case, the cross-section of the holding frame 140 of the upper mask set 132a faces the cross-section of the holding frame 142 of the lower mask set 132b that will be described with reference to FIG. 15, that is, is horizontally arranged parallel to the same.

Referring to FIG. 15, the holding frame 142 of the lower mask set 132b has a structure in which a ring-shaped upper fixing member 152 and a ring-shaped lower fixing member 154 are engaged with each other in the wedge shape and coupled with each other by the fixing screws 150 to hold and support a supporting part 156 of the lower shadow mask M2.

The holding of the holding frame 142 will be described in detail with reference a to c of FIG. 15 as follows.

Firstly, when the fixing screws 150 are fastened to the upper fixing member 152 and the lower fixing member 154, as shown in FIG. 15a, the supporting part 156 of the lower shadow mask M2 is held by a wedge-shaped protrusion of the upper fixing member 152 and a wedge-shaped groove of the lower fixing member 154. When the fixing screws 150 are further fastened, as shown in FIG. 15b, the coupling surfaces of the upper fixing member 152 and the lower fixing member 144 are gradually moved close to each other such that the lower shadow mask M2 is drawn toward the upper and lower fixing members 512 and 154 to keep the shadow masks M, M1, and M2 adequately strained. FIG. 15c shows the fixing screws 150 that are completely fastened.

When forming the lower fixing member 154, a supporting step 158 to which the supporting part 156 of the shadow mask M2 contacts is preferably cut to form a round surface so that the bending or cutting of the supporting part 156 can be prevented. Moreover, the upper surface of the supporting step 158 of the lower fixing member 154 is higher than the upper surface of the upper fixing member 152 by a height d as shown in FIG. 15c when the lower shadow mask M2 is completely held such that the upper shadow mask M1 of the upper mask set 132a facing the lower mask set 132b can approach extremely close to the lower shadow mask M2. Moreover, the wedge-shaped coupling configuration between the upper fixing member 152 and the lower fixing member 154 (the configuration of the wedge-shaped groove and the wedge-shaped protrusion) is preferably formed about at two places (at the outer circumference and the inner circumference), and among them, an external angle θ between the wedge-shaped groove and the wedge-shaped protrusion positioned on the outer circumference is preferably less than 90 degrees as shown in FIG. 15b.

The holding structures of the holding frames 136, 140, and 142 of the single mask set 130 and the two upper and lower mask sets 132a and 132b tightly hold the respective shadow masks M, M1, and M2 to maintain the tensile forces of the shadow masks M, M1, and M2 constant. Thus, deflection of the respective shadow masks M, M1, and M2 can be prevented.

Referring to FIGS. 9 and 10 again, on the upper side of the mask set 130 in FIG. 9, a substrate fixing plate 116 is installed to approach and be parallel to the single shadow mask M. Similarly, on the upper sides of the upper and lower mask sets 132a and 132b, the substrate fixing plate 116s are installed to approach and be parallel to the upper and lower shadow masks M1 and M2.

On the lower surface of the substrate fixing plate 116, the substrate 12 is attached and fixed by a plurality of fixing pins or a plurality of slide pin-shaped fixing segments. On the upper side of the substrate fixing plate 116, the heater 118 is coupled, and the heater 118 is coupled with the fixing plate 122 by a plurality of fixing rods 160.

Between the horizontal mover 126 and the heaters 118, a heat shielding plate 162 coupled to the fixing rods 160 is positioned to prevent heat generated from the heater 118 from being transmitted to the cassette control unit 74, the horizontal mover 126, and the vertical mover 124, which are positioned above the heater 118. The heater 118 pre-heats the substrate 12 positioned therebelow to increase the deposition density of a thin film of the multi-layer chip capacitor 10 that is formed on the substrate 12 by deposition. Temperature applied to the substrate 12 during the vacuum deposition is preferably from 200 degrees centigrade to 400 degrees centigrade.

In the above structure, the shadow masks M, M1, and M2 are installed to be parallel to the substrate 12, and gaps between the shadow masks M, M1, and M2 are extremely small, ranging from a few to tens of μm during the vacuum deposition.

FIG. 16 is a vertical sectional view illustrating the relationship between the shadow mask M and the slits S according to the first embodiment of the present invention, and FIG. 17 is a vertical sectional view illustrating the relationship between the shadow masks M1 and M2 and the slits S according to the second embodiment of the present invention.

Theoretically, it is mostly preferred to form a uniform deposition layer by which the thicknesses of the shadow masks are as thin as possible and the vertical cross-sections of the slits S are rectangular. However, in the actual manufacturing of the shadow masks, there is a limit to how thin the thickness can be made and it is not realistic that the vertical cross-sections of the slits S are etched into the rectangular shape. Thus, in the embodiments of the present invention, the cross-sections are implemented in various forms like the examples shown in FIGS. 16 and 17 to achieve effect similar to the case of the thin thickness of the shadow mask M such that the deposition film is as uniform as possible.

Examples of the vertical cross-section of the slits S of the shadow mask M according to the first embodiment of the present invention, may be various, such as a parallelogram as shown in FIG. 16a, a parallelogram with a step as shown in FIG. 16b, a trapezoid as shown in FIG. 16c, and a trapezoid with a step as shown in FIG. 16d.

Examples of the vertical cross-sections of the slits S of the shadow masks M1 and M2 according to the second embodiment of the present invention, may be various, such as a quadrilateral as shown in FIG. 17a, a trapezoid as shown in FIG. 17b, a trapezoid with a step as shown in FIG. 17c, and a parallelogram as shown in FIG. 17d.

In the slits S formed in the upper and lower shadow masks M1 and M2 in FIG. 17 in the same way, since an opening area of the slits (hereinafter referred to as "slit pattern") formed in the form of an actual deposition film is optionally adjusted by the relative movement of the upper and lower mask sets 132a and 132b facing each other, the size of the slits S is not limited.

Moreover, it is clear to those skilled in the art that the vertical cross-sections of the slits S according to the first and second embodiments of the present invention are not limited to the examples in FIGS. 16 and 17 but can be modified and changed in various forms.

FIGS. 18 to 24 are enlarged views illustrating various examples of the slit patterns formed by the relative movement of the upper and lower mask sets 132a and 132b according to the second embodiment of the present invention. As shown in FIGS. 18 to 24, the X-axis indicates the width direction of the multi-layer chip capacitor 10, the Y-axis indicates the longitudinal direction of the multi-layer chip capacitor 10, and the X-axis indicates the height direction thereof.

Slit patterns P1, P2, and P3 in FIGS. 18 to 20 are examples of the slit patterns for forming the upper and lower terminal layers 22a, 22b, 16a, and 16b in the multi-layer chip capacitor 10 in FIG. 5, and slit patterns P4 and P5 in FIGS. 21 and 22 are examples of the slit patterns for forming the dielectric layer 20 in the multi-layer chip capacitor 10 in FIG. 5. Moreover, FIGS. 23 and 24 shows that slit patterns P6 and P7 are examples of the slits for forming the first and second inner electrode layers 18a and 18b in the multi-layer chip capacitor 10 in FIG. 5.

When the dielectric layer 20 and the inner electrode layers 18a and 18b are alternately deposited to manufacture the multi-layer chip capacitor 10, since this embodiment of the present invention uses the mask assembly 76 capable of controlling the transfer of the shadow masks M, M1, and M2 in the horizontal direction and the height direction (the Z-axis) containing the width direction (the X-axis) and the longitudinal direction (the Y-axis), at least three slit patterns can be formed. Due to the control of the formation of the various slit patterns using the mask assembly 76, the sequence of 'releasing the vacuum? the exchange of the mask? the re-vacuumizing', which is carried out whenever forming the respective layers in the conventional vacuum deposition, can be omitted, such that the multi-layer chip capacitors 10 can be manufactured in commercial quantities by a relative simple process.

Referring to FIG. 6 again, the structures of the dielectric substance source feeder 80 and the conductor source feeders 82a and 82b, which are installed on the bottom of the chamber 52 of the apparatus for manufacturing a multi-layer chip capacitor 50, will be described in detail with reference to FIGS. 25 to 28.

FIG. 25 is a front sectional view of the dielectric substance source feeder 80 in FIG. 6, and FIG. 26 is an enlarged and exploded perspective view of a portion "E" in FIG. 25.

As described with reference to FIG. 6, the dielectric substance source feeder 80 is installed such that the evaporation position of the dielectric layer deposition source H1 is positioned at the bottom center of the vacuum deposition room in the chamber 25.

Before describing in detail with reference to FIG. 25, it should be pointed out that the dielectric layer deposition source H1, at the evaporation position, among plural dielectric layer deposition sources H1 that are provided in a dielectric index drum 200 in FIG. 25, is at the right side in the drawing to be rotated and elevated by a rod shaft 214.

Described with reference FIG. 25 in more detail, the dielectric substance source feeder 80 is structured such that the dielectric substance index drum 200 having the plural dielectric layer deposition sources H1 arranged along the circumference is mounted around a rotation shaft 202 to be rotated by an index drum rotating device 204. The index drum rotating device 204 includes a servo motor, a gear, and a rotary motion, and is installed on the lower surface of the bottom of the chamber 52. A source rotating device 206 and a source elevating device 208 for rotating and elevating the dielectric layer deposition source H1 are installed on the lower surface of the bottom of the chamber 52.

The source rotating device 206 is connected to a screw net 219 in the chamber by a geared structure, and the source elevating device 208 is connected to a spline nut 212 equipped in the lower side of the screw net 210 by a geared structure. The screw net 210 and the spline nut 212, as shown in the enlarged view in FIG. 26, are engaged with a spiral recess 220 and a vertical recess 210 of the rod shaft 214 to rotate and elevate the rod shaft 214.

On the upper surface of the rod shaft 214, a fixing tip 216 with a T-shaped vertical cross-section is coupled. The fixing tip 216 is inserted into a butterfly-shaped locking groove 224 formed in the lower surface of a cup-shaped source holder 222 positioned above. The cylindrical dielectric layer deposition source H1 is inserted into an upper coupling groove of the source holder 222, and the dielectric layer deposition source H1 inserted into the source holder 222 is fixed to the source holder 222, for example, in the shrinkage fitting.

Referring to the enlarged exploded perspective view in FIG. 26, the rod shaft 214 allows the T-shaped fixing tip 216 to be inserted into an insertion hole 226 formed at a side of the locking groove 224 in the lower surface of the source feeder 222. The fixing tip 216 inserted along the insertion hole 226 is locked by a step formed at the opposite side of the locking groove 122 when the rod shaft 214 rotates, and at this state, the rod shaft 214 further rotates and the source holder 222 is locked and rotated together therewith.

During the vacuum deposition, when the rod shaft 214 is slowly rotated by the source rotating device 206, the dielectric layer deposition source H1 fixed to the source holder 222 is slowly rotated. The slow rotation of the dielectric layer deposition source H1 makes a material of the dielectric layer deposition source H1 be evaporated uniformly. Moreover, when the rod shaft 214 is slowly elevated by the source elevating device 208, the dielectric layer deposition source H1 fixed to the source holder 222 is slowly elevated. Due to the elevation of the dielectric layer deposition source H1, the evaporation position, which is gradually lowered as the deposition material is gradually vanished, is maintained at a predetermined evaporation position.

The control of the rotation and the elevation of the dielectric layer deposition source H1 as described above minimizes or prevents the diffusion of the deposited film during the manufacturing of the dielectric layer 20 of the multi-layer chip capacitor 10.

Meanwhile, if the dielectric layer deposition source H1 needs to be exchanged with a new one because of the vanishing of the dielectric layer deposition source H1 used in the evaporation, the source holder 222, to which the vanished dielectric layer deposition source H1 is fixed, is controlled to be separated from the rod shaft 214.

In other words, the rod shaft 214 is controlled to rotate toward the insertion hole 226 of the locking groove 224, that is, the separation direction. Then, the fixing tip 216 locked in and fixed to the locking groove 122 is pulled out from the insertion hole 123 of the locking groove 122. By doing so, the source holder 222, to which the vanished dielectric layer deposition source H1 is fixed, is separated from the fixing tip 216 of the rod shaft 214.

After that, when the dielectric substance index drum 200 is rotated such that the source holder 222, to which the new dielectric layer deposition source H1 is fixed, is locked by and fixed to the fixing tip 216 of the rod shaft 214, the exchange of the new dielectric layer deposition source H1 is completed.

This exchange of the dielectric layer deposition source H1 has an advantage of omitting the sequence of 'releasing the vacuum? the exchange of the deposition source? the re-vacuumizing' which must be further carried out.

As a material of the dielectric layer deposition source H1 according to the embodiment of the present invention, ceramic dielectric substance such as $TiO_2$, $AlO_3$, $SiO_2$, and the like may be used, and ABO3 type ferroelectrics such as $BaTiO_3$, $SrRiO_3$, $BaSrTiO_3$, $PbZrTiO_3$, and the like may be also used.

Among them, the dielectric layer deposition source using the ABO3 type ferroelectric as a material typically co-evaporates with a plurality of deposition sources.

So to speak, according to the conventional art, as shown in FIG. 27a, since deposition sources 250 and 252 spaced apart from each other by a distance L are provided to carry out the vacuum deposition in the co-evaporation, a trapezoidal deposition film 256 is formed on a substrate 254 positioned above and the diffusion of the deposition film occurs.

As a solution of the above problem, when the ABO3 type ferroelectric is used as the dielectric layer deposition source H1, in the embodiment of the present invention, a multi-type deposition source is integrated as one body as shown in FIG. 28. In short, a core rod 262, which is made by sintering an oxide ceramic material or a metal such as T1 or the mixture thereof to be matched to mol % of the components of the deposition film becomes a single deposition material, and an outer pipe 260 made by sintering a metal such as T1 or the oxide ceramic material to be matched to the mol % of the components of the deposition film and having a diameter becomes another single deposition material. In this state, when the core rod 262 is inserted into the outer pipe 260 and integrated with each other, a co-evaporation type dielectric substance multi-deposition source 264 is achieved.

When the integrated dielectric substance multi-deposition source 264 is implemented as described above, as shown in FIG. 27b, in the embodiment of the present invention, dielectric substance deposition sources may be formed to be spaced apart from each other only by L' which is much shorter than the existing distance L. Thus, the diffusion of the deposition film 270 formed on the substrate 12 is significantly reduced in comparison to that of the conventional art.

As described above, the dielectric substance source feeder 80 is installed on the bottom of the vacuum deposition room in the chamber 52, and the conductor source feeders 82a and 82b are respectively installed to the lateral sides of the dielectric substance source feeders 80.

FIG. 29 is a front sectional view of the conductor source feeders 82a and 82b in FIG. 6, and FIG. 30 is an enlarged partial perspective view illustrating a portion "F" in FIG. 29.

In FIG. 29, a reference numeral 300 is assigned to a conductor index drum, a reference numeral 302 is assigned to a rotation shaft, a reference numeral is assigned to an index drum rotating device, a reference numeral 306 is assigned to a source rotating device, a reference numeral 308 is assigned to a source elevator, a reference numeral 310 is assigned to a screw nut, a reference numeral 312 is assigned to a spline nut, a reference numeral 314 is assigned to a rod shaft, and a reference numeral 316 is assigned to a fixing tip. Moreover, a reference numeral H2 is assigned to an inner electrode layer deposition source, and a reference numeral H3 is assigned to an electrode layer deposition source. The reference numerals H2 and H3 are the conductor layer deposition sources.

Since the structures and operation of the conductor source feeders 82a and 82b in FIG. 29 are similar to the structure and operation of the dielectric substance source feeder 80 described with reference to FIG. 25, the detailed description thereof will be omitted.

However, the conductor index drum 300 into which a plurality of electrode layer deposition sources H3 and a plurality of inner electrode layer deposition sources H2 are inserted, as shown in FIGS. 29 and 30, further includes an insulating cap 320, and this makes the conductor index drum 300 different from the dielectric substance index drum 200 of the dielectric substance source feeder 80.

In more detail, the metal electrode layer deposition source H3 and the inner electrode deposition source H2, which are installed in the conductor index drum 300, have relative high thermal conductivities so that heat transmitted from the respective conductor evaporators 84a and 84b can be conducted to the conductor index drum 300. In order to prevent this, the conductor index drum 300 includes the insulating cap 320 made of a ceramic having a relative low thermal conductivity, and the electrode layer deposition source H3 and the inner electrode layer deposition source H2 are installed in the insulating cap 320.

The deposition process S34 in the main process S2 will be described in detail using the apparatus 50 for manufacturing a multi-layer chip capacitor structured as described above as follows.

As described with reference to FIG. 3, after sequentially carrying out the vacuumizing process S30 and the substrate pre-heating process S32 in the main process S2, the deposition process S34 is carried out, and the vacuum releasing process S36 is carried out after the deposition process S34.

The deposition process S34, an essential process of the main process S2, forms the first and second lower terminal layers 16a and 16b, the dielectric layer 20, the first and second inner electrode layers 18a and 18b, and the first and second upper terminal layers 22a and 22b of the multi-layer chip capacitor 10 in FIG. 5 by the vacuum deposition. Since the evaporated particles evaporated during the vacuum deposition in the embodiment of the present invention are atoms, molecules, and ions, the sizes of the evaporated particles have units of Å.

The deposition process S34 is carried out in two ways in the present invention. The first one is to manufacture the multi-layer chip capacitor 10 by using a single shadow mask M and adjusting a deposition angle thereof, and is the method according to the first embodiment of the present invention. The second one is to manufacture the multi-layer chip capacitor 10 by using two shadow masks M1 and M2 and adjusting the slit patterns, and is the method according to the second embodiment of the present invention.

The single shadow mask K (the first embodiment) and the two shadow masks M1 and M2 (the second embodiment) can be moved in the X-, Y-, and Z-axes space (three dimension) and the mask assembly 76 itself can rotate according to the embodiments of the present invention. Moreover, the mask assembly 76 can revolve about the revolving shaft 62 of the revolving body 64 and can also travel within the chamber 52.

The respective rotation and revolution of the plural mask assemblies 76 enable the deposition films, growing on the substrates 12 loaded in the corresponding mask assemblies 76 by the vacuum deposition, to be grown uniformly. The rotation speed and the revolution speed of the respective mask assemblies 76 are dependent on pre-determined deposition rate with respect to capacitors to be manufactured, and it should be pointed out that, in order to form a deposition film, the rotation and the revolution of the mask assemblies 76 must be controlled to occur at least a few or tens of times. In this case, the rotation and the revolution of the respective mask assemblies 76 are continued.

It should be pointed out that the evaporation range of the particles evaporated from the dielectric layer deposition source H1 in the embodiment of the present invention, as shown in FIG. 31, is set to affect all the mask assemblies 76 mounted in the revolving bodies 64 by shafts, and the respective mask assemblies 76 are installed such that the lower surfaces of all the mask assemblies 76 are perpendicular to the evaporation directions of the dielectric layer deposition sources H1 that are installed on the bottom center of the vacuum deposition room 54 of the chamber 52.

Moreover, in the embodiments of the present invention, when the dielectric layers 20 of the multi-layer chip capacitor 10 shown in FIG. 5 are formed, as shown in FIG. 31, the rotation and the revolution of the mask assemblies 76 are controlled simultaneously. In other words, a main controller of the apparatus 50 for manufacturing a multi-layer chip capacitor controls the revolution of the revolving bodies 64 and the rotation of the mask assemblies 76 simultaneously.

On the other hand, when the conductor layer, that is, the inner electrode layers 18a and 18b and the terminal layers 16a, 16b, 22a, and 22b are formed, the mask assemblies 76, as shown in FIG. 32, revolve in the embodiments of the present invention. Additionally, the chamber 52 is divided into a deposition region A1 and a non-deposition region A2, wherein the mask assemblies 76 revolve to grow the films by the vacuum deposition in the deposition region A1. However, in the non-deposition region A1, none of the films is deposited on the substrates 12, and the mask assemblies 76 are rotated by 180 degrees under the control of the main controller of the apparatus 50 for manufacturing a multi-layer chip capacitor. The deposition region A1 and the non-deposition region A2 are determined by optionally opening the openings 402 in the conductor hatches 86.

The reason of controlling the mask assemblies 76 to rotate by 180 degrees in the non-deposition region A2 is to compensate the growth difference of the films between the right and left portions of the substrates 12 loaded in the mask assemblies 76 when the films are deposited and grown in the deposition region A1 and to increase the growth of the films.

Although only four regions among the overall eight regions are assigned to the deposition region A1 in FIG. 32, it is obvious to those skilled in the art that a single region to three regions can be assigned to the deposition region if necessary the simultaneous performance of the conductor layer deposition in the four regions increases the efficiency of the respective conductor layers, that is, the inner electrode layers 18a and 18b and the terminal layers 16a, 16b, 22a and 22b in FIG. 5.

FIG. 33 is a view illustrating operation of the conductor hatches 86.

When the conductor layers are formed, as shown in FIG. 33, due to the thickness of the deposition films 400 needlessly deposited on the shadow masks M1 and M2 (containing M), the deposition films 404 of the conductor layers, that is, the inner electrode layers 18a and 18b and the terminal layers 16a, 16b, 22a and 22b may be shifted to one side and grown.

In the embodiment of the present invention, in order to minimize or prevent this phenomenon, as shown in FIG. 33, the opening positions of the openings 402 of the conductor hatches 86 are shifted to compensate an incident angle of the evaporated particles to be changed from an incident angle before the shift of the opening positions of the openings 402 to θ2. As a result, the corresponding deposition films 404 can be grown uniformly.

Now, the deposition process S34 of the main process S1 according to the first embodiment of the present invention will be described in detail. During the deposition process S34, the respective materials of the conductor layer deposition sources H2 and H3 and the dielectric layer deposition source H1 are alternately evaporated such that the respective layers on the releasing layers 14, coated on the substrates 12, are deposited.

FIG. 34 a detailed flowchart illustrating the deposition process of the main process according to the first embodiment of the present invention, and FIG. 35 is a view illustrating a process of manufacturing the multi-layer chip capacitor during the deposition process of the main process according to the first embodiment of the present invention. FIG. 36 is an enlarged view illustrating the deposited conductor layer and dielectric layer according to the first embodiment of the present invention.

Referring to FIG. 36, in the first embodiment of the present invention, the dielectric layer and the conductor layer having different width in the width direction (the X-axis) are formed using a single shadow mask M. The width of the dielectric layer 20 is W2 and the width of the first inner electrode layer 18a, an example of the conductor layer is W1 which is relatively narrower than W2. As the conductor layers, there are the first and second inner electrode layers 18a and 18b, the first and second lower terminal layers 16a and 16b, and the first and second upper terminal layers 22a and 22b.

FIG. 37 is a sectional view illustrating the deposition carried out in the width direction (the X-axis) of the multi-layer chip capacitor 10 in the first embodiment of the present invention, and FIG. 38 is a sectional view illustrating the deposition carried out in the longitudinal direction (the Y-axis) of the multi-layer chip capacitor 10 in the first embodiment of the present invention.

Referring to FIGS. 37 and 38, it is preferred that the width directional (the X-axis) cross-section of the slits S of the shadow mask M according to the first embodiment of the present invention is a parallelogram (See FIG. 37), and the longitudinal directional (the Y-axis) cross-section thereof is a trapezoid (See FIG. 38).

As shown in FIG. 37, since the width directional cross-section of the slits S is a parallelogram, a pseudo-thickness of the shadow mask M is very thin when viewing from the conductor deposition source H2 to the slits S, and as little as an unnecessary film as possible is prevented from being deposited on oblique surfaces of the slits S. When viewing from the conductor deposition source H2 to the slits S, the width of openings of the slits is relatively narrower than the width of the openings of the slits when viewing from a point perpendicular to the shadow mask M. Moreover, as shown in FIG. 38, since the longitudinal directional cross-section of the slits S is a trapezoid, as many of the evaporated particles as possible can pass through the slits without disturbance caused by edges formed by the thickness of the slits.

The formation of the deposition film in the width direction (the X-axis) according to the first embodiment of the present invention will be described in detail with reference to FIG. 37.

As shown in FIG. 37b, a single shadow mask M is used and the material of the dielectric layer deposition source H1 is evaporated in the form of particles in the direction perpendicular to the shadow mask M so that the dielectric layer 20, with the width W2 relatively wider than the widths WI of the conductor layer, that is, the inner electrode layers 18a and 18b and the terminal layers 16a, 16b, 22a, and 22b, is formed on the substrate 12.

Moreover, FIG. 37a illustrates that the materials of the conductor deposition sources H2 and H3 are evaporated in the form of particles in the direction oblique to the shadow mask M so that a conductor layer, with the width WI narrower than the width W2 of the dielectric layer 20, is formed on the substrate 12.

The deposition of the conductor layer, with the narrow width W1, is carried out by positioning the conductor deposition sources H2 and H3 at the evaporation position oblique to the shadow mask M. The obliquity, as shown in FIGS. 37a and 37c, can be defined as a deposition angle $\theta 1$ with respect to the direction perpendicular to the shadow mask M, wherein the deposition angle $\theta 1$ is preferred to be within the range from 5 degrees to 45 degrees. When the deposition angle $\theta 1$ is less than 5 degrees, since the difference between the widths of the dielectric layer and the conductor layer is very small, the insulation between adjacent conductor layers formed by the dielectric layer may be broken. When the deposition angle $\theta 1$ is greater than 45 degrees, the efficiency of a vacuum deposited capacitor is deteriorated.

Referring to FIG. 36 again, in the first embodiment of the present invention, the first inner electrode layer 18a, being an example of the conductor layer, extends farther than the dielectric layer 20 in the longitudinal direction (the Y-axis), and this is achieved by moving the shadow mask M in the longitudinal direction (the Y-axis) using the horizontal mover 126.

The formation of the deposition film in the longitudinal direction (the Y-axis) according to the first embodiment of the present invention will be described in detail with reference to FIG. 38 as follows.

As shown in FIGS. 38a and 38c, the conductor layers, that is, the first inner electrode layer 18a and the second inner electrode layer 18b extend respectively to the lateral sides of the dielectric layer 20 as the shadow mask M moves toward the positive (+) Y-direction and the negative (−) Y-direction along the longitudinal direction. Moreover, as shown in FIG. 38b, the dielectric layer 20 is adjusted to be aligned with the center line of the lower dielectric layer 20 in the Y-axis and extended therealong.

In the first embodiment of the present invention, due to the above operation, even when the conductor layer and the dielectric layer are alternately formed, the short between the upper and lower conductor layers is prevented, and the coverage of the conductor layer can be extended to the lateral sides of the dielectric layer when the conductor layer is formed.

The deposition process S34 of the main process S2, illustrated in FIG. 3, according to the first embodiment of the present invention is carried out after carrying out the vacuumizing process S30 and the substrate preheating process S32. The main control in the deposition process S34 is carried out by a main controller (not shown) of the apparatus 50 for manufacturing a multi-layer chip capacitor in FIG. 6.

The deposition process S34 according to the first embodiment of the present invention will be described in detail with reference to FIG. 34.

Firstly, the main controller performs a variety of controls for the deposition in the step 500 in FIG. 34. The main controller controls the plasma beam projector 88 to project a plasma beam to the vacuum deposition room 54, and controls the radio bias generator 112 of the cassette control unit 74 to apply radio bias to the substrate 12 of the mask assembly 76. Moreover, the main controller controls the rotation and the revolution of the mask assembly 76 such that the deposition film can be grown at a uniform thickness.

Moreover, the main controller moves the mask set 130 mounted in the mask assembly 76 downwardly along the Z-axis based on the growth rate of the film being deposited now by a small degree such that the deposition film formed on the substrate 12 does not contact the shadow mask M. The growth rate of a film being deposited is dependent on a predetermined deposition rate for the manufacturing of the corresponding capacitor.

Moreover, in another example of the present invention for moving the mask set 130 downwardly along the Z-axis based on the growth rate of the film, the mask set 130 is controlled such that the shadow mask M is sufficiently separated from the substrate 12 (for example, about 5 μm) during the deposition of the film, and after that, the mask set 13 is controlled such that the separated shadow mask M is precisely positioned and adjusted above the shaft based on the degree of the growth being deposited. These controls are repeatedly carried out for every predetermined time period.

When the control and circumstance for the deposition are completed, the main controller, as illustrated in a step 502 of FIG. 34, moves the mask set 130 to the deposition position of the lower terminal layers on the substrate 12. In other words, the cassette control units 74 receive position control commands such that the lower terminal layers 16 are formed on the releasing layers 14 coated on the substrates 12, as shown in FIG. 35a. Then, the cassette control unit 74 controls the position of a single mask set 130 mounted in the mask assembly 76. The cassette control unit 74 controls the position of the mask set 130 in at least one axis among the X-, Y-, and Z-axes using the horizontal mover 126 and the vertical mover 124. By doing so, the single shadow mask M mounted in the mask set 130 is fixed to the lower side of the substrate 12 where the first and second lower terminal layers 16a and 16b are formed.

After carrying out the step 502 in FIG. 34, the main controller processes a step 504 in FIG. 34. In the step 504 of FIG. 34, the main controller commands the respective devices such that the lower terminal layers 16 are formed on the releasing layers 14 coated on the substrates 12, as shown in FIG. 35a. In other words, the terminal layer deposition sources H3, filled in the respective conductor source feeders 82a and 82b, are moved to the evaporation position by rotating the conductor index drum 133, and the material of the terminal layer deposition sources H3 is evaporated by the conductor evaporators 84a and 84b so that the lower terminal layers 16 are formed on the releasing layers 14, coated on the substrates 12, by the evaporated particles. The evaporated particles evaporated from the terminal layer deposition sources H3, as shown in FIGS. 37a, 38a, and 38c, are evaporated at the deposition angle oblique with respect to the shadow mask M and pass through the slits S of the shadow mask, and are then deposited on the releasing layers 14 of the substrates 12.

In this case, the control for the evaporation of the terminal layer deposition sources H3, as shown in FIG. 32, is carried out only in the deposition regions A1, but not in the non-deposition regions A2. In the non-deposition regions A2, the corresponding mask assembly 76 rotates by 180 degrees.

One deposition film of the respective layers containing the lower terminal layers 16 is formed by revolving the mask assembly 76 by a few to tens of times. By doing so, the lower terminal layers 16 can be separated from each other on the releasing layer 14, which is coated and dried on the substrate 12. It should be pointed out that the lower terminal layers 16 are cut into the first and second lower terminal layers 16a and 16b as shown in FIG. 5 in the post-process.

After the formation of the lower terminal layers 16, the main controller controls the mask set 130 to move downward along the Z-axis and to be sufficiently separated from the substrate 12 in a step 506, illustrated in FIG. 34. In this case, the separation distance is a few of mm to hundreds of mm. After the film deposition, the control of sufficiently separating the mask set 130 from the substrate 12 prevents the deposition film formed already on the substrate 12 from being damaged by the movement of the shadow mask M due to the horizontal position control.

After the performance of the step 506 in FIG. 34, the main controller commands the position control to the cassette control unit 74 such that the dielectric layer 20, as shown in FIG. 35b, is formed on the first and second lower terminal layers 16a and 16b. The cassette control unit 74 controls the position of a single mask set 130, mounted in the mask assembly 76, in at least one of the X-, Y-, and Z-axes such that the single shadow mask M mounted in the mask set 130 is fixed to the lower side of the substrate 12 at the position where the dielectric layer 20 is formed.

After that, in a step 510 in FIG. 34, the main controller controls a dielectric substance evaporator (not shown) to evaporate the material of the dielectric layer deposition source H1 such that a part of the first and second lower terminal layers 16a and 16b and the dielectric layer 20 therebetween are formed by the evaporated particles from the material. The evaporated particles evaporated from the dielectric layer deposition source H1, as shown in FIGS. 37b and 38b, are evaporated in the direction perpendicular to the shadow mask M, pass through the slits S of the shadow mask, and are deposited on the first and second lower terminal layers 16a and 16b as shown in FIG. 35b to form the dielectric layer 20.

In this case, the control for the evaporation of the dielectric layer deposition source H1 is carried out for the respective mask assemblies 76 as shown in FIG. 31. By doing so, the dielectric layers 20, as shown in FIG. 35b, are deposited and formed between the adjacent terminal layers 16 and on a part of the adjacent terminal layers 16.

After that the formation of the dielectric layers 20 as described above, in a step 512 in FIG. 34, the main controller controls the mask set 130 to move downwardly along the Z-axis and to be sufficiently spaced apart from the substrate 12.

After that, in a step 514, the main controller, as shown in FIG. 35c, controls the cassette control unit 74 such that the first inner electrode layer 18a is formed on the dielectric layer 20. As a result, the mask set 130 is moved along at least one of the X-, Y-, and Z-axes. Thus, the single shadow mask mounted in the mask set 130 is fixed to the lower side of the substrate 12 at the position where the first inner electrode layer 18a is formed.

After that, in a step 518 in FIG. 34, the conductor evaporators 84a and 84b evaporate the materials of the inner electrode deposition sources H2 such that the inner electrode layers are formed on the dielectric layers 20 by the evaporated particles. The evaporated particles evaporated from the inner electrode are evaporated obliquely to the shadow mask M, pass through the slits S of the shadow mask M, and are deposited on the dielectric layer 20.

In this case, the control for the evaporation of the inner electrode layer deposition source H2, as shown in FIG. 32 is carried out only in the deposition regions A1, but not in the non-deposition regions A2. In the non-deposition regions A2, the corresponding mask assembly 76 rotates by 180 degrees.

When the deposition of the inner electrode layers is completed by doing so, on the dielectric layer 20, the first inner electrode layers are formed in the form as shown in FIG. 35c.

As shown in FIG. 35c, the widths of the first inner electrode layers 18a are relatively narrower than the widths of the dielectric layers 20, and are shifted to the lateral sides of the dielectric layers 20 (downward in FIG. 35) to naturally extend to the lower terminal layers 16 to be formed as the first lower terminal layers 16a and then to be electrically connected to the first inner electrode layers 18a and the first lower terminal layers 16a, as shown in FIG. 5.

After the first inner electrode layers 18a are formed as described above, the main controller, like the step 518 in FIG. 34, controls the mask set 130 to be spaced from the substrate 12, and carries out the step 520 in FIG. 34 to the step 522 in FIG. 34 such that the dielectric layers 20 are deposited and formed on the first inner electrode layers 18a in the form as shown in FIG. 35d.

After the dielectric layers 20 are formed in the form as shown in FIG. 35d, like in the step 524 of FIG. 34, the mask set 130 is spaced apart from the substrate 12, and a step 526 in FIG. 34 to a step 530 in FIG. 34 are carried out such that the second inner electrode layers 18b are deposited and formed on the lower dielectric layers 20 in the form as shown in FIG. 35e.

The widths of the second inner electrode layers 18b are relatively narrower than the widths of the dielectric layers 20, and are shifted to the opposite lateral sides of the dielectric layers 20 (to the upper side in FIG. 35) to be extended to the lower terminal layers 16 to be formed as the second lower terminal layers 16b, and to be electrically connected to the second inner electrode layers 18b and the first lower terminal layers 16b as shown in FIG. 5.

The above first and second inner electrode layers 18a and 18b are naturally connected to the first and second lower terminal layers 16a and 16b so that a separated lateral electrode formation process in the conventional art can be omitted. Moreover, the two first and second inner electrode layers 18a and 18b are electrically insulated by interposing the dielectric layer 20 therebetween so that the multi-layer chip capacitor works well as a capacitor.

After the second inner electrode layers 18b are formed, the main controller carries out a step 532 to a step 536 in FIG. 34 to form the dielectric layers 20 thereon as shown in FIG. 35f.

After that, the step 514 to the step 536 in FIG. 34 of forming the first inner electrode layers 18a, the dielectric layers 20, and the second electrode layers 18b are carried out repeatedly until the predetermined capacitance of the capacitor is achieved as described for the determination in the step 538 in FIG. 34.

When the predetermined capacitance is achieved by doing so, the main controller carries out a step 540 to form the first upper terminal layers 22a and the second upper terminal layers 22b at the lateral sides of final dielectric layers to be formed on the uppermost layer as shown in FIG. 35g. In this case, the deposition source is the terminal layer deposition source H3.

The multi-layer chip capacitor depicted in FIG. 35g is a capacitor completed by the deposition process, and after that, is cut in the B-B' direction during the post-process S3 into chip-shaped multi-layer chip capacitors 10. After that, during the post-process S3, the capacitor is exposed to a high temperature for a predetermined time such that the capacitors are separated from the substrate 12 and are annealed in a higher temperature for a predetermined time, then the multi-layer chip capacitors 10 are completed.

On the other hand, the main controller can carry out the ion cleaning of the mask M every predetermined time period provided based on the deposition rate, and can use the plasma beam projector 88 as an example of the ion cleaning. The periodic ion cleaning of the mask M removes the deposition films unnecessarily deposited on the mask M. The ion cleaning by the plasma beam is carried out when forming the conductor layers is switched to forming the dielectric layers or vice versa, and a substrate on which the deposition film is formed is protected from the plasma beam by a substrate protector (not shown).

Next, the deposition process according to the second embodiment of the present invention will be described in detail as follows. In the second embodiment of the present invention, two shadow masks are used and the slit patterns of the masks are adjusted to manufacture the multi-layer chip capacitor.

The deposition process according to the second embodiment of the present invention is to change the slit patterns formed in the upper and lower shadow masks M1 and M2 by the movements of the upper and lower mask sets 132a and 132b to form the deposition films by the vacuum deposition. By doing so, the first and second lower terminal layers 16a and 16b, the dielectric layers 20, the first and second inner electrode layers 18a and 18b, and the first and second upper terminal layers 22a and 22b of the multi-layer chip capacitor 10 are formed as depicted in FIG. 5.

FIG. 39 is a detailed flowchart illustrating the deposition process of the main process according to the second embodiment of the present invention, and FIGS. 40 and 41 are views of a process of manufacturing the multi-layer chip capacitor 10 during the deposition process of the main process according to the second embodiment of the present invention.

Before describing the deposition process according to the second embodiment of the present invention with reference to FIG. 39, it should be pointed out that since the control of the deposition regions A1 and the non-deposition regions A2 during the formation of the conductor layers in the second embodiment of the present is carried out like the first embodiment described with reference to FIG. 34, the description will be omitted and other operations similar to those in the first embodiment will be also omitted.

Firstly, the main controller carries out various controls for the deposition in a step 600 of FIG. 39. Since the variety of controls for the deposition is similar to the controls in the step 500 of FIG. 34 in the first embodiment of the present invention, the detailed description will be omitted.

After a step 600 in FIG. 39 is carried out, the main controller controls the cassette control units 74 such that, as shown in FIG. 40a or FIG. 41a, the first and second lower terminal layers 16a and 16b are formed on the releasing layers 14 coated on the substrate 12 in a step 602. Thus, the cassette control unit 74 controls the positions of the upper and lower mask sets 132a and 132b mounted in the mask assemblies 76. In other words, the cassette control unit 74 controls the upper and lower mask sets 132a and 132b to move oppositely in the longitudinal direction (the Y-axis) to form the slit patterns of the first and second lower terminals for arranging the dielectric layers 20 between first and second lower terminals 55 and 56.

After that, the main controller processes a step 604 in FIG. 39 to form the first and second lower terminal layers 12a and 12b. In more detail, the main controller controls the terminal layer deposition sources H3 filled in the conductor source feeders 82a and 82b to move to the evaporation position by rotating the conductor index drum 133, and the materials of the terminal layer deposition sources H3 are evaporated by the evaporator 85 such that the evaporated particles are deposited on the releasing layers 14 coated on the substrates 12 to form a pair of lower terminal layers, that is, the first and second lower terminal layers 12a and 12b as shown in FIG. 40a or a single lower terminal layer 12 as shown in FIG. 41a.

The slit patterns for forming the first and second lower terminal layers 12a and 12b as shown in FIG. 40a are the slit patterns P2 in FIG. 19, and the slit patterns for forming the lower terminal layer 12 in FIG. 41a are the slit patterns P1 in FIG. 18.

The main controller forms the first and second lower terminal layers 12a and 12b in a step 604 of FIG. 39 and moves the upper and lower mask sets 132a and 132b downwardly along the Z-axis to be sufficiently spaced apart from the substrate 12 in a step 606 of FIG. 39.

When the upper and lower mask sets 132a and 132b move, the residual deposited material that could be adhered to the upper and lower shadow masks M1 and M2 may separate during the movement of the upper and lower mask sets 132a and 132b thereby contaminating the deposition sources, in order to prevent this, the upper and lower mask sets 132a and 132b are preferably moved differently from each other.

After the step 606 in FIG. 39 is carried out, the main controller processes a step 608 in FIG. 39. In the step 608 of FIG. 39, the cassette control unit 74 is controlled to form patterns of the dielectric layer as shown in FIG. 41b. Thus, the cassette control unit 74 controls the positions of the upper and lower mask sets 132a and 132b mounted in the mask assembly 76 such that the upper and lower shadow masks M1 and M2 are formed like the slit patterns P5 as shown in FIG. 22.

After that, the main controller processes a step 610 in FIG. 39 such that a pipe-shaped index drum 118 is rotated to move the dielectric layer deposition source H1 filled in the dielectric substance source feeder 80 to the evaporation position and to evaporate the material of the dielectric layer deposition source H1 using the dielectric substance evaporator. By doing so, the evaporated particles thereof are deposited between the first and second terminal layers 16a and 16b and on parts of the terminal layers 16a and 16b such that the dielectric layers 20 are formed as shown in FIG. 40b. Moreover, as shown in FIG. 41b, the dielectric layers 20 are formed between the lower terminal layers 16 adjacent to each other and on parts of the lower terminal layers 16.

After that, the main controller controls the upper and lower mask sets 132a and 132b to be spaced apart from the substrate 12 in a step 612 of FIG. 39.

After that, a step 614 in FIG. 39 is processed such that the main controller controls the cassette control unit 74 to form the slit patterns for the formation of the first inner electrode layers 18a, and the first inner electrode layers 18a are formed in a step 616 of FIG. 39 (See FIG. 40c and FIG. 41c).

When the first inner electrode layers 18a are formed, the pipe-shaped index drum 133 is rotated to move the inner electrode layer deposition sources H2 filled in the conductor source feeders 82a and 82b to the evaporation position, and the materials of the inner electrode layer deposition sources H2 are evaporated by the conductor evaporators 74a and 74b such that the first inner electrode layers 18a are formed in the vacuum deposition.

After the first inner electrode layers 18a are formed, the upper and lower mask sets 132a and 132b are controlled to be spaced apart from the substrate 12 in a step 618 of FIG. 39, and the main controller controls the cassette control unit 74 to form the slit patterns for the formation of the dielectric layers in a step 620 and to form the dielectric layers 20 in a step 622 (See FIG. 40c and FIG. 41d).

After that, the main controller controls the cassette control unit 74 to form the slit patterns for the formation of the second inner electrode layers 18b and the second inner electrode layers 18b (a step 624 to a step 630 in FIG. 39, FIG. 40e, and FIG. 41e).

After the second inner electrode layers 18b are formed, the dielectric layers 20 are formed thereon as shown in FIG. 40f or FIG. 41f (a step 632 to a step 636 in FIG. 39), and after that, a step 608 to a step 636 in FIG. 39 for forming the first inner electrode layers 18a, the dielectric layers 20, and the second electrode layers 18b are repeated until the predetermined capacitance of the capacitor is achieved.

By doing so, when the capacitance is achieved (by the determination in the step 638 of FIG. 39), the main controller carries out a step 640 to a step 644 such that, on the lateral side surfaces of the final dielectric layers formed on the uppermost layer, the first upper terminal layers 22a or the second upper terminal layers 22b as shown in FIG. 40g, or the upper terminal layers 22 as shown in FIG. 41g is formed.

The multi-layer chip capacitor depicted in FIG. 41g is a capacitor completed by the deposition process, and after that, during the post-process, is cut along the line C-C' into the completed multi-layer chip capacitors 10 by the cutting such as dicing.

To sum up the slit patterns of the upper shadow masks M1 and M2 for the manufacturing of the multi-layer chip capacitor, there are the slit patterns P2 for forming the upper and the lower terminal layers 16 and 22, slit patterns P5 for forming the dielectric layers 58, and the slit patterns P7 for forming the first and second inner electrode layers 18a and 18b. Moreover, to sum up the slit patterns of the upper shadow masks 16a, 16b, 22a, and 22b for manufacturing the multi-layer chip capacitor in FIG. 41, there are the slit patterns P1 for forming the upper and lower terminal layers 16a, 16b, 22a, and 22b, the slit patterns P4 for forming the dielectric layers 20, and the slit patterns P6 for forming the first and second inner electrode layers 18a and 18b.

The above slit patterns are examples for helping to understand the second embodiment of the present invention, and it is obvious to those skilled in the art that a variety of deposition films can be formed by the combination of the slit patterns P1 to P7.

As described above, when the multi-layer chip capacitor is manufactured by the deposition process S34, the vacuum releasing process S36 of the main process S2 is carried out. The vacuum releasing process S36 is a process of releasing vacuum in the chamber 52.

Although the embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention can be applied to a field for manufacturing a multi-layer chip capacitor.

The invention claimed is:

1. An apparatus for manufacturing a multi-layer chip capacitor under a high vacuum, comprising:
   a chamber;
   a revolving body mounted to revolve in an upper side of the chamber;
   a plurality of mask assemblies rotatably installed on a circumference of the revolving body;
   a mask set in each mask assembly, each mask set including a shadow mask, the mask sets movable in any horizontal or vertical direction relative to the mask assembly;
   a substrate positioned on an upper side of the shadow mask and parallel to the shadow mask; and
   a dielectric layer deposition source and a conductor layer deposition source installed on a bottom of the chamber,
   wherein the dielectric layer deposition source is positioned perpendicular to the shadow mask and the conductor layer deposition source is positioned oblique to the shadow mask.

2. The apparatus for manufacturing a multi-layer chip capacitor according to claim 1, wherein the dielectric layer deposition source comprises a dielectric multi-deposition source in which a core rod made by sintering a first dielectric deposition material is inserted into and integrated with an outer pipe made by sintering a second dielectric deposition material.

3. The apparatus for manufacturing a multi-layer chip capacitor according to claim 2, wherein a diameter of the core rod and the outer pipe are determined based on mol % of the components of the deposition film.

4. The apparatus for manufacturing a multi-layer chip capacitor according to claim 1, further comprising a conductor index drum for accommodating the conductor layer deposition source and an insulation cap installed in the conductor index drum to thermally insulate the conductor layer deposition source from the exterior.

5. The apparatus for manufacturing a multi-layer chip capacitor according to claim 1, wherein each mask set has an upper frame and a lower frame, and wherein each shadow mask has a hold supporting part, the hold supporting part being coupled between the upper frame and lower frame by a wedge shaped coupling.

6. The apparatus for manufacturing a multi-layer chip capacitor according to claim 5, further comprising a conductor index drum for accommodating the conductor layer deposition source and an insulation cap installed in the conductor index drum to thermally insulate the conductor layer deposition source from the exterior.

7. The apparatus for manufacturing a multi-layer chip capacitor according to claim 5, wherein the upper and lower mask sets have an upper frame and a lower frame, respectively, and Wherein each shadow mask has a hold supporting part, the hold supporting part being coupled between the upper frame and the lower frame by a wedge shaped coupling.

8. The apparatus for manufacturing a multi-layer chip capacitor according to claim 1, further comprising a plasma beam projector for projecting a plasma beam into the vacuum deposition room to give a shock to particles evaporated from the conductor layer deposition source and the dielectric layer deposition source.

9. An apparatus for manufacturing a multi-layer chip capacitor comprising:
a chamber;
a revolving body mounted to revolve in an upper side of the chamber;
a plurality of mask assemblies rotatably installed on a circumference of the revolving body;
each mask assembly having a shadow mask and an upper and lower mask set facing each other and moved by a horizontal mover and a vertical mover;
a substrate installed above and parallel to the shadow mask, the shadow mask moved to form slit patterns; and
a dielectric layer deposition source, a conductor layer deposition source, and respective deposition source evaporators thereof, installed on the bottom of the chamber such that particles evaporated from the deposition sources pass through the slit patterns to be deposited on the substrate.

* * * * *